(12) United States Patent
Blackwell et al.

(10) Patent No.: US 12,543,630 B2
(45) Date of Patent: Feb. 10, 2026

(54) ROW UNIT COMPONENT MOUNTING SYSTEMS, METHODS, AND APPARATUS FOR AGRICULTURAL IMPLEMENTS

(71) Applicant: Kinze Manufacturing, Inc., Williamsburg, IA (US)

(72) Inventors: Robert Blackwell, Williamsburg, IA (US); Dean Martin, Williamsburg, IA (US); Dalton McDowell, Williamsburg, IA (US)

(73) Assignee: Kinze Manufacturing, Inc., Williamsburg, IA (US)

( * ) Notice: Subject to any disclaimer, the term of this patent is extended or adjusted under 35 U.S.C. 154(b) by 769 days.

(21) Appl. No.: 17/813,982

(22) Filed: Jul. 21, 2022

(65) Prior Publication Data

US 2023/0022522 A1 Jan. 26, 2023

Related U.S. Application Data

(60) Provisional application No. 63/203,401, filed on Jul. 21, 2021.

(51) Int. Cl.
- *A01C 7/20* (2006.01)
- *A01B 71/04* (2006.01)
- *A01C 5/06* (2006.01)

(52) U.S. Cl.
CPC .............. *A01C 7/203* (2013.01); *A01B 71/04* (2013.01); *A01C 5/064* (2013.01)

(58) Field of Classification Search
CPC ........... A01C 7/203; A01C 7/201; A01C 7/20; A01C 7/00; A01C 5/064; A01C 5/062;
(Continued)

(56) References Cited

U.S. PATENT DOCUMENTS

| 5,235,922 A | 8/1993 | Deckler |
| 7,918,168 B2 | 4/2011 | Garner et al. |

(Continued)

FOREIGN PATENT DOCUMENTS

| CA | 2989927 A1 * | 7/2018 | ............ B60T 8/1708 |
| DE | 102015101256 A1 | 7/2016 | |

(Continued)

OTHER PUBLICATIONS

International Search Report and Written Opinion in PCT/US2022/074000, mailed Jan. 2, 2023, 21 pages.

(Continued)

*Primary Examiner* — Christopher J. Novosad
(74) *Attorney, Agent, or Firm* — McKee, Voorhees & Sease, PLC

(57) ABSTRACT

An agricultural implement, such as an agricultural seed planter, includes a number of ground engaging row units. The row units receive seed and/or other particulates and deposit the seed or particulates to the ground. The row unit can include row cleaners to aid in allowing a coulter or disk to create a furrow in a field. The seed is metered via a seed metering system and deposited in the furrow. A closing system closes the furrow after the seed has been deposited. To aid in access and mounting of the seed meter, it can be connected without connection to side components of a frame. In addition, the row cleaner and closing system can include mounting systems that allow better results and easier access to the same and other portions of the row units.

12 Claims, 36 Drawing Sheets

(58) Field of Classification Search
CPC .. A01C 5/06; A01C 5/00; A01B 71/04; A01B 71/00
See application file for complete search history.

(56) References Cited

U.S. PATENT DOCUMENTS

| | | | |
|---|---|---|---|
| 8,276,529 B2 | 10/2012 | Garner et al. |
| 8,448,587 B2 | 5/2013 | Kowalchuk |
| 8,448,717 B2 | 5/2013 | Adams et al. |
| 8,468,960 B2 | 6/2013 | Garner et al. |
| 8,522,699 B2 | 9/2013 | Garner et al. |
| 8,522,889 B2 | 9/2013 | Adams et al. |
| 8,543,238 B2 | 9/2013 | Straeter |
| 8,544,397 B2 | 10/2013 | Bassett |
| 8,544,398 B2 | 10/2013 | Bassett |
| 8,634,992 B2 | 1/2014 | Sauder et al. |
| 8,646,249 B1 | 2/2014 | Vollmers et al. |
| 8,776,702 B2 | 7/2014 | Bassett |
| 8,789,482 B2 | 7/2014 | Garner et al. |
| 8,807,236 B2 | 8/2014 | Remoue |
| 8,850,995 B2 | 10/2014 | Garner et al. |
| 8,868,300 B2 | 10/2014 | Kocer et al. |
| 8,909,436 B2 | 12/2014 | Achen et al. |
| 8,910,582 B2 | 12/2014 | Mariman et al. |
| 8,924,092 B2 | 12/2014 | Achen et al. |
| 8,924,102 B2 | 12/2014 | Sauder et al. |
| 8,985,037 B2 | 3/2015 | Radtke et al. |
| 8,985,232 B2 | 3/2015 | Bassett |
| 9,026,321 B2 | 5/2015 | Henry et al. |
| 9,055,712 B2 | 6/2015 | Bassett |
| 9,072,216 B2 | 7/2015 | Johnson et al. |
| 9,107,337 B2 | 8/2015 | Bassett |
| 9,107,338 B2 | 8/2015 | Bassett |
| 9,113,589 B2 | 8/2015 | Bassett |
| 9,137,940 B2 | 9/2015 | Wendte et al. |
| 9,144,187 B2 | 9/2015 | Bassett |
| 9,144,189 B2 | 9/2015 | Stoller et al. |
| 9,148,992 B2 | 10/2015 | Straeter |
| 9,167,740 B2 | 10/2015 | Bassett |
| 9,173,339 B2 | 11/2015 | Sauder et al. |
| 9,179,593 B2 | 11/2015 | Anderson et al. |
| 9,192,089 B2 | 11/2015 | Bassett |
| 9,192,091 B2 | 11/2015 | Bassett |
| 9,215,837 B2 | 12/2015 | Adams et al. |
| 9,215,838 B2 | 12/2015 | Bassett |
| 9,215,839 B2 | 12/2015 | Bassett |
| 9,226,440 B2 | 1/2016 | Bassett |
| 9,232,687 B2 | 1/2016 | Bassett |
| 9,237,687 B2 | 1/2016 | Sauder et al. |
| 9,288,937 B2 | 3/2016 | Sauder et al. |
| 9,307,688 B2 | 4/2016 | Adams et al. |
| 9,307,689 B2 | 4/2016 | Adams et al. |
| 9,338,937 B2 | 5/2016 | Sauder et al. |
| D759,729 S | 6/2016 | Harnetiaux et al. |
| 9,363,943 B2 | 6/2016 | Connors et al. |
| 9,398,739 B2 | 7/2016 | Silbernagel et al. |
| 9,408,337 B2 | 8/2016 | Sauder et al. |
| 9,408,341 B2 | 8/2016 | Straeter |
| 9,420,739 B2 | 8/2016 | Rollenhagen |
| 9,426,940 B2 | 8/2016 | Connors et al. |
| D767,642 S | 9/2016 | Anderson et al. |
| 9,451,740 B2 | 9/2016 | Kowalchuk |
| 9,526,201 B2 | 12/2016 | Wendte et al. |
| 9,532,496 B2 | 1/2017 | Sauder et al. |
| 9,578,799 B2 | 2/2017 | Allgaier et al. |
| 9,585,302 B2 | 3/2017 | Anderson |
| 9,585,304 B2 | 3/2017 | Roberge et al. |
| 9,603,299 B2 | 3/2017 | Wendte et al. |
| 9,622,401 B2 | 4/2017 | Stevenson |
| 9,622,402 B2 | 4/2017 | Kinzenbaw et al. |
| 9,629,304 B2 | 4/2017 | Zielke |
| 9,629,305 B2 | 4/2017 | Kinzenbaw et al. |
| 9,648,800 B2 | 5/2017 | Garner et al. |
| 9,648,802 B2 | 5/2017 | Wendte et al. |
| 9,664,249 B2 | 5/2017 | Kowalchuk |
| 9,668,401 B2 | 6/2017 | Raetzman et al. |
| 9,674,999 B2 | 6/2017 | Achen et al. |
| 9,675,003 B2 | 6/2017 | Straeter |
| 9,675,004 B2 | 6/2017 | Landphair et al. |
| 9,681,601 B2 | 6/2017 | Bassett |
| 9,686,900 B2 | 6/2017 | Raetzman et al. |
| 9,686,901 B2 | 6/2017 | Achen et al. |
| 9,699,951 B2 | 7/2017 | Dienst et al. |
| 9,699,955 B2 | 7/2017 | Garner et al. |
| 9,730,377 B2 | 8/2017 | Kowalchuk |
| 9,730,378 B2 | 8/2017 | Raetzman et al. |
| 9,743,576 B2 | 8/2017 | Gadzella et al. |
| 9,743,578 B2 | 8/2017 | Blomme et al. |
| 9,750,174 B2 | 9/2017 | Sauder et al. |
| 9,750,176 B2 | 9/2017 | Raetzman et al. |
| 9,750,178 B2 | 9/2017 | Kinzenbaw et al. |
| 9,756,779 B2 | 9/2017 | Wilhelmi et al. |
| 9,763,380 B2 | 9/2017 | Hahn et al. |
| 9,795,077 B2 | 10/2017 | Hahn et al. |
| 9,801,328 B2 | 10/2017 | Garner et al. |
| 9,801,329 B2 | 10/2017 | Zielke |
| 9,801,332 B2 | 10/2017 | Landphair et al. |
| 9,807,921 B2 | 11/2017 | Levy et al. |
| 9,807,922 B2 | 11/2017 | Garner et al. |
| 9,807,923 B2 | 11/2017 | Wilhelmi et al. |
| 9,814,172 B2 | 11/2017 | Achen et al. |
| 9,820,425 B2 | 11/2017 | Wendte et al. |
| 9,820,429 B2 | 11/2017 | Garner et al. |
| 9,832,921 B2 | 12/2017 | Anderson et al. |
| 9,832,924 B2 | 12/2017 | Anderson et al. |
| 9,848,522 B2 | 12/2017 | Bassett |
| 9,848,523 B2 | 12/2017 | Sauder et al. |
| 9,848,524 B2 | 12/2017 | Sauder et al. |
| 9,848,526 B2 | 12/2017 | Gadzella et al. |
| 9,848,527 B2 | 12/2017 | Natarajan et al. |
| 9,854,724 B2 | 1/2018 | Adams et al. |
| 9,854,728 B2 | 1/2018 | Johnson et al. |
| 9,861,022 B2 | 1/2018 | Bassett |
| 9,861,031 B2 | 1/2018 | Garner et al. |
| 9,872,423 B2 | 1/2018 | Anderson et al. |
| 9,872,424 B2 | 1/2018 | Baurer et al. |
| 9,872,425 B2 | 1/2018 | Anderson et al. |
| 9,879,702 B2 | 1/2018 | Stoller et al. |
| 9,883,624 B2 | 2/2018 | Helmick et al. |
| 9,883,625 B2 | 2/2018 | Koch et al. |
| 9,888,624 B2 | 2/2018 | Maniar et al. |
| 9,894,831 B2 | 2/2018 | Wendte et al. |
| 9,901,026 B2 | 2/2018 | Kinzenbaw et al. |
| 9,907,222 B2 | 3/2018 | Adams et al. |
| 9,924,629 B2 | 3/2018 | Batcheller et al. |
| 9,936,625 B2 | 4/2018 | Wendte et al. |
| 9,936,631 B1 | 4/2018 | Hubner et al. |
| 9,943,027 B2 | 4/2018 | Sauder et al. |
| 9,955,623 B2 | 5/2018 | Sauder et al. |
| 9,955,625 B2 | 5/2018 | Baurer et al. |
| 9,961,825 B2 | 5/2018 | Allgaier et al. |
| 9,968,028 B2 | 5/2018 | Anderson et al. |
| 9,974,221 B2 | 5/2018 | Kowalchuk |
| 9,980,425 B2 | 5/2018 | Wilhelmi et al. |
| 9,980,429 B2 | 5/2018 | Levy |
| 9,992,923 B2 | 6/2018 | Friggstad |
| 9,992,926 B2 | 6/2018 | Raetzman et al. |
| 9,999,175 B2 | 6/2018 | Baurer et al. |
| 10,010,024 B2 | 7/2018 | Pirkenseer et al. |
| 10,010,025 B2 | 7/2018 | Dienst et al. |
| 10,030,796 B2 | 7/2018 | Johnson |
| 10,045,474 B2 | 8/2018 | Bachman et al. |
| 10,045,477 B2 | 8/2018 | Hagny et al. |
| 10,051,782 B2 | 8/2018 | Wilhelmi et al. |
| 10,070,576 B2 | 9/2018 | Swanson |
| 10,085,375 B2 | 10/2018 | Engel et al. |
| 10,091,927 B2 | 10/2018 | Garner et al. |
| 10,111,375 B2 | 10/2018 | Wendte et al. |
| 10,143,127 B2 | 12/2018 | Wilhelmi et al. |
| 10,143,128 B2 | 12/2018 | Landphair et al. |
| 10,149,424 B2 | 12/2018 | Maust et al. |
| 10,172,274 B2 | 1/2019 | Connell et al. |
| 10,188,027 B2 | 1/2019 | Hahn et al. |
| 10,206,325 B2 | 2/2019 | Schoeny et al. |

(56) References Cited

U.S. PATENT DOCUMENTS

| | | |
|---|---|---|
| 10,206,327 B2 | 2/2019 | Hahn et al. |
| 10,219,421 B2 | 3/2019 | Achen et al. |
| 10,219,430 B2 | 3/2019 | Blomme et al. |
| 10,219,431 B2 | 3/2019 | Stoller et al. |
| 10,225,977 B2 | 3/2019 | Kinzenbaw et al. |
| 10,238,023 B2 | 3/2019 | Sauder et al. |
| 10,238,024 B2 | 3/2019 | Bassett |
| 10,244,672 B2 | 4/2019 | Pirkenseer et al. |
| 10,244,674 B2 | 4/2019 | Kinzenbaw et al. |
| 10,251,326 B2 | 4/2019 | Andrews |
| 10,251,332 B2 | 4/2019 | Roberge et al. |
| 10,257,973 B2 | 4/2019 | Hubner et al. |
| 10,257,975 B2 | 4/2019 | Kinzenbaw et al. |
| 10,264,724 B2 | 4/2019 | Adams et al. |
| 10,296,017 B2 | 5/2019 | Schoeny et al. |
| 10,327,374 B2 | 6/2019 | Achen et al. |
| 10,334,771 B2 | 7/2019 | Dienst et al. |
| 10,349,575 B2 | 7/2019 | Straeter |
| 10,359,062 B2 | 7/2019 | Stoller et al. |
| 10,362,725 B2 | 7/2019 | Johnson et al. |
| 10,368,476 B2 | 8/2019 | Andrews et al. |
| 10,383,272 B2 | 8/2019 | Kovach |
| 2007/0039746 A1 | 2/2007 | Bettin et al. |
| 2009/0090284 A1 | 4/2009 | Peterson, Jr. et al. |
| 2011/0162565 A1 | 7/2011 | Rylander |
| 2012/0255475 A1 | 10/2012 | Mariman et al. |
| 2013/0032362 A1 | 2/2013 | Rylander |
| 2014/0190382 A1 | 7/2014 | Anderson et al. |
| 2014/0303854 A1 | 10/2014 | Zielke |
| 2014/0331633 A1 | 11/2014 | Vandeven et al. |
| 2014/0352991 A1 | 12/2014 | Patwardhan et al. |
| 2016/0050842 A1 | 2/2016 | Sauder et al. |
| 2016/0128265 A1 | 5/2016 | Bassett |
| 2016/0128268 A1 | 5/2016 | Garner et al. |
| 2016/0128273 A1 | 5/2016 | Garner et al. |
| 2016/0234996 A1 | 8/2016 | Sauder et al. |
| 2017/0000015 A1 | 1/2017 | Raetzman et al. |
| 2017/0000019 A1 | 1/2017 | Harnetiaux et al. |
| 2017/0049040 A1 | 2/2017 | Kinzenbaw |
| 2017/0049044 A1 | 2/2017 | Stoller et al. |
| 2017/0156253 A1 | 6/2017 | Kester |
| 2017/0202130 A1 | 7/2017 | Schoolman et al. |
| 2017/0318727 A1 | 11/2017 | Roberge et al. |
| 2017/0318736 A1 | 11/2017 | Roberge et al. |
| 2017/0339819 A1 | 11/2017 | Kowalchuk et al. |
| 2018/0000001 A1 | 1/2018 | Bassett |
| 2018/0014456 A1 | 1/2018 | Conrad et al. |
| 2018/0020610 A1 | 1/2018 | Posselius |
| 2018/0049366 A1 | 2/2018 | Frasier et al. |
| 2018/0092287 A1 | 4/2018 | Garner et al. |
| 2018/0092288 A1 | 4/2018 | Garner et al. |
| 2018/0092289 A1 | 4/2018 | Wonderlich et al. |
| 2018/0092290 A1 | 4/2018 | Hubner et al. |
| 2018/0092292 A1 | 4/2018 | Rhodes et al. |
| 2018/0092293 A1 | 4/2018 | Rhodes |
| 2018/0116101 A1 | 5/2018 | Garner et al. |
| 2018/0124998 A1 | 5/2018 | Swanson et al. |
| 2018/0125000 A1 | 5/2018 | Levy et al. |
| 2018/0125002 A1 | 5/2018 | Stoller et al. |
| 2018/0139886 A1 | 5/2018 | Dietrich, Sr. |
| 2018/0153093 A1 | 6/2018 | Koch et al. |
| 2018/0153096 A1 | 6/2018 | Garner et al. |
| 2018/0160615 A1 | 6/2018 | Natarajan et al. |
| 2018/0184576 A1 | 7/2018 | Sauder et al. |
| 2018/0184581 A1 | 7/2018 | Morgan et al. |
| 2018/0199498 A1 | 7/2018 | Adams et al. |
| 2018/0208058 A1 | 7/2018 | Czapka et al. |
| 2018/0224537 A1 | 8/2018 | Taylor et al. |
| 2018/0242517 A1 | 8/2018 | Davis et al. |
| 2018/0243771 A1 | 8/2018 | Davis et al. |
| 2018/0243772 A1 | 8/2018 | Davis et al. |
| 2018/0243773 A1 | 8/2018 | Davis et al. |
| 2018/0310469 A1 | 11/2018 | Posselius et al. |
| 2018/0317380 A1 | 11/2018 | Bassett |
| 2018/0317381 A1 | 11/2018 | Bassett |
| 2018/0325010 A1 | 11/2018 | Connell et al. |
| 2018/0325019 A1 | 11/2018 | Connell et al. |
| 2018/0338413 A1 | 11/2018 | Connell et al. |
| 2018/0343788 A1 | 12/2018 | Engel et al. |
| 2018/0343789 A1 | 12/2018 | Engel et al. |
| 2019/0000004 A1 | 1/2019 | Sloneker et al. |
| 2019/0014714 A1 | 1/2019 | Swanson et al. |
| 2019/0021211 A1 | 1/2019 | Gutknecht |
| 2019/0029165 A1 | 1/2019 | Leimkuehler et al. |
| 2019/0045703 A1 | 2/2019 | Bassett |
| 2019/0053421 A1 | 2/2019 | Schoeny et al. |
| 2019/0059199 A1 | 2/2019 | Stanhope |
| 2019/0059206 A1 | 2/2019 | Stanhope et al. |
| 2019/0072114 A1 | 3/2019 | Myers et al. |
| 2019/0098828 A1 | 4/2019 | Wilhelmi et al. |
| 2019/0110388 A1 | 4/2019 | Gresch et al. |
| 2019/0110391 A1 | 4/2019 | Gresch et al. |
| 2019/0110392 A1 | 4/2019 | Gresch et al. |
| 2019/0124824 A1 | 5/2019 | Hubner et al. |
| 2019/0143814 A1 | 5/2019 | Czapka et al. |
| 2019/0159398 A1 | 5/2019 | McMenamy et al. |
| 2019/0166754 A1 | 6/2019 | Johnson et al. |
| 2019/0183036 A1 | 6/2019 | Leimkuehler et al. |
| 2019/0191618 A1 | 6/2019 | Bassett |
| 2019/0191623 A1 | 6/2019 | Stoller et al. |
| 2019/0200517 A1 | 7/2019 | Schoeny et al. |
| 2019/0216006 A1 | 7/2019 | Hubner |
| 2019/0216007 A1 | 7/2019 | Hubner et al. |
| 2019/0219606 A1 | 7/2019 | Radtke et al. |
| 2019/0239425 A1 | 8/2019 | Garner et al. |
| 2019/0239426 A1 | 8/2019 | Garner et al. |
| 2019/0254223 A1 | 8/2019 | Eichhorn et al. |
| 2019/0313566 A1 | 10/2019 | Salowitz et al. |
| 2020/0396894 A1 | 12/2020 | Radtke et al. |
| 2020/0396897 A1 | 12/2020 | Stoller et al. |
| 2021/0059095 A1 | 3/2021 | Sloneker et al. |

FOREIGN PATENT DOCUMENTS

| | | |
|---|---|---|
| EP | 2340700 A1 | 11/2010 |
| IN | 1079MUM2012 A | 12/2013 |
| WO | 2015171908 A1 | 11/2015 |
| WO | 2015171915 A1 | 11/2015 |
| WO | 2016205421 A1 | 12/2016 |
| WO | 2016205424 A1 | 12/2016 |
| WO | 2019108881 A1 | 6/2019 |
| WO | 2019139834 A1 | 7/2019 |

OTHER PUBLICATIONS

International Preliminary Report on Patentability in PCT/US2022/074000, mailed Feb. 1, 2024, 13 pages.

* cited by examiner

ROW UNIT COMPONENT MOUNTING SYSTEMS, METHODS, AND APPARATUS FOR AGRICULTURAL IMPLEMENTS

CROSS-REFERENCE TO RELATED APPLICATIONS

This application claims priority under 35 U.S.C. § 119 to provisional patent application U.S. Ser. No. 63/203,401 filed Jul. 21, 2021. The provisional patent application is herein incorporated by reference in its entirety, including without limitation, the specification, claims, and abstract, as well as any figures, tables, appendices, or drawings thereof.

FIELD OF THE INVENTION

The invention relates generally to systems, apparatus, and/or methods of use in at least the agricultural industry, and in particular, agricultural implements. More particularly, but not exclusively, the invention relates to agricultural planters, and row units associated therewith. The row units include ground engaging elements that are mounted to the row unit in adjustable manners.

BACKGROUND OF THE INVENTION

An agricultural row crop planter is a machine built for precisely distributing seed into the ground. The row crop planter generally includes a horizontal toolbar fixed to a hitch assembly for towing behind a tractor. Row units are mounted to the toolbar. In different configurations, seed may be stored at individual hoppers on each row unit, or it may be maintained in a central hopper and delivered to the row units on an as needed basis. The row units include ground-working tools for opening and closing a seed furrow, and a seed metering system for distributing seed to the seed furrow.

The row units include a number of components that, while operating together to best plant seed and/or apply a particulate, are independently mountable and/or movable with respect to one another. In addition, the components may be attached a frame portion.

For example, a metering member, such as a pneumatic seed meter, finger pickup meter, brush meter, or the like, is mounted to the row unit to meter a particulate, such as seed, such that the seed is delivered towards the ground in a manner to attempt to space the seed in a desired manner according to speed, soil type, or other agronomic indicators.

Row cleaners are used to mitigate the impact of trash in front of a row unit as the implement with row units moves through a field. Trash may be in the form of dirt clods, sticks, shrubs, crop residue left over from harvest, or other debris. The row cleaners can be raised and lowered to selectively address any trash in front of a row unit as it is pulled by a prime mover (e.g., tractor or other tow vehicle) through a field. The row cleaner aids in the development of a furrow and placement of the seed or other particulate material. The row cleaner may also include a coulter wheel, such as when planting in a no-till area. The no-till coulter aids in breaking down trash in addition to the cleaner moving the trash to further aid in clearing the area where the furrow will be created, and the seed planted and/or the particulate material applied.

Still further, to create a furrow, a disc, coulter, or the like is used to dig into the ground to create a desired trench to place the seed. The depth of the furrow, and thus the positioning of the disk, is set to attempt to maintain a furrow of desired depth for planting, such as based upon agronomic data or input. To aid in controlling the depth, the coulter disc may be coupled to one or more gauge wheels, which ride upon the ground. The gauge wheels are coupled to the disc to attempt to maintain a depth of furrow created by the disc, and the gauge wheels can be set or adjusted via a gauge wheel arm. A depth setting assembly can also be used to control the depth. However, it may also be desirable to adjust the gauge wheels laterally, and also to include gauge wheels that include greaseless bushings.

At the rear of the row unit is a closing system. The closing system is used to close the furrow after the seed or other particulate has been placed or otherwise delivered in the furrow. The closing system can include a closing mechanism, such as a closing wheel, which is coupled to the row unit via a closing wheel arm. A biasing member can also be used to attempt to hold the closing wheel in place during use, such as to mitigate floating of the closing wheel as the row unit moves through a field. However, the closing wheel may not always be needed, and it may be desired to move the closing wheel and/or system out of the way such that it is not contacting the ground.

Thus, there exists a need in the art for agricultural row units that include novel and unique mounting mechanisms for any number of components of a row unit. The mountings will overcome the issues, such as by providing improvements in functionality, repair, and/or accessibility for any of the components of the row unit.

SUMMARY OF THE INVENTION

The following objects, features, advantages, aspects, and/or embodiments, are not exhaustive and do not limit the overall disclosure. No single embodiment need provide each and every object, feature, or advantage. Any of the objects, features, advantages, aspects, and/or embodiments disclosed herein can be integrated with one another, either in full or in part.

It is a primary object, feature, and/or advantage of the invention to improve on or overcome the deficiencies in the art.

It is a further object, feature, and/or advantage to mount or other connect a seed meter to a row unit without the use of side plates or additional frame members. The meter may be rotatably mounted to easily access the meter and internal components of the row unit, such as the seed delivery system.

It is still yet a further object, feature, and/or advantage to provide an electronic raising and lowering system for a row cleaner of a row unit, which will quickly and easily maneuver a row cleaner system for use and non-use configurations.

It is another object, feature, and/or advantage to adjust a no-till coulter mechanism without tools.

It is still another object, feature, and/or advantage to separate the components of a gauge wheel mechanism, which provides easy replacement of a full gauge wheel arm in an easy manner.

It is yet another object, feature, and/or advantage to provide an easy adjustment of a gauge wheel are with a greaseless bushing.

It is another object, feature, and/or advantage to include a quick change and connect closing system for a row unit. The system can be locked in an upturned configuration to lock the closing system out of the way for non-use configurations.

It is another object, feature, and/or advantage to include a toolless scraper for a coulter disc that is easily accessible.

The row unit, implement, and/or any of the components disclosed herein can be used in a wide variety of applications. For example, it is envisioned that the systems be used with agricultural implements, such as planting implements. However, any of the aspects provided could be used for other implements, such as tillage or other types of particulate or seed application.

It is preferred the apparatus be safe, cost effective, and durable.

At least one embodiment disclosed herein comprises a distinct aesthetic appearance. Ornamental aspects included in such an embodiment can help capture a consumer's attention and/or identify a source of origin of a product being sold. Said ornamental aspects will not impede functionality of the invention.

Methods can be practiced which facilitate use, manufacture, assembly, maintenance, and repair of a row unit and/or agricultural implement which accomplish some or all of the previously stated objectives.

According to at least some aspects and/or embodiments disclosed herein, a row unit for an agricultural implement comprises a gauge wheel assembly, comprising a gauge wheel arm having an aperture therethrough; a hollow bearing positioned in the aperture; a row unit pin positioned at least partially through the hollow bearing; and a depth adjustment member extending at least partially from the aperture and externally therefrom, said row unit pin adjustable relative to the depth adjustment member.

According to at least some aspects of some embodiments, the gauge wheel assembly further comprises a second gauge wheel arm positioned at a second and opposite end of the row unit pin, wherein said second gauge wheel arm further including a second hollow bearing positioned in an aperture of the second gauge wheel arm.

According to at least some aspects of some embodiments, the row unit further comprises a second depth adjustment member at the second end of the row unit pin to allow adjustment of the row unit pin relative to the second adjustment member.

According to at least some aspects of some embodiments, the hollow bearing comprises a greaseless bearing.

According to at least some aspects of some embodiments, the greaseless bearing comprises a fiber bushing.

According to at least some aspects of some embodiments, the row unit further comprises a bolt positioned through the depth adjustment member and at least partially into a portion of the row unit pin to aid in holding the pin in place.

According to at least some aspects of some embodiments, the row unit further comprises snap rings on opposite sides of the hollow bearing to aid in holding the bearing in place in the aperture of the gauge wheel arm.

According to at least some aspects of some embodiments, the row unit further comprises a gauge wheel pocket operatively connected to the gauge wheel arm, wherein a movable dog bone at least partially housed in the pocket, wherein the gauge wheel pocket connected to the gauge wheel arm via a single bolt, and wherein the gauge wheel pocket comprises a wear component.

According to at least some aspects and/or embodiments of the disclosure, a row unit for an agricultural implement comprises a row unit frame; a closing assembly operatively connected to the row unit frame, said closing assembly comprising: a closing assembly frame including: a first position wherein a first connection point and a second connection point connect the closing assembly to the row unit frame to position the closing assembly in a lowered position; and a second position wherein a first connection point connects the closing assembly to the row unit frame and a third connection point is positioned external of the row unit frame to position the closing wheel assembly in a raised position.

According to at least some aspects of some embodiments, the closing assembly further comprises one or more closing wheels connected to the closing assembly frame.

According to at least some aspects of some embodiments, the closing assembly further comprises a biasing member to bias the one or more closing wheels towards the ground when the closing wheel assembly is in the lowered position.

According to at least some aspects of some embodiments, the biasing member comprises: a pneumatic device; a spring; a hydraulic actuator; or an electric, linear actuator.

According to at least some aspects of some embodiments, the biasing member comprises an air bag.

According to at least some aspects of some embodiments, the closing assembly frame comprises a mounting member and a linkage connected to the mounting member.

According to at least some aspects of some embodiments, the one or more closing wheels and the biasing member are positioned at the linkage.

According to at least some aspects of some embodiments, the mounting member comprises an L-shaped member.

According to at least some aspects of some embodiments, the first and third connection points positioned on the mounting member generally adjacent one another, and wherein the second connection point positioned opposite the first and third connection points.

According to at least some aspects of some embodiments, the first, second, and third connection points comprise apertures with pins positioned therethrough when the connection points are connected.

According to at least some aspects of some embodiments, only two of the three connection points include pins in either the raised or lowered positions.

According to at least some aspects of some embodiments, the first and second connection points correspond to apertures in the row unit frame, and wherein the third connection point does not correspond to an aperture in the row unit frame.

These and/or other objects, features, advantages, aspects, and/or embodiments will become apparent to those skilled in the art after reviewing the following brief and detailed descriptions of the drawings. Furthermore, the present disclosure encompasses aspects and/or embodiments not expressly disclosed but which can be understood from a reading of the present disclosure, including at least: (a) combinations of disclosed aspects and/or embodiments and/or (b) reasonable modifications not shown or described.

BRIEF DESCRIPTION OF THE DRAWINGS

Several embodiments in which the invention can be practiced are illustrated and described in detail, wherein like reference characters represent like components throughout the several views. The drawings are presented for exemplary purposes and may not be to scale unless otherwise indicated.

Figure 1:
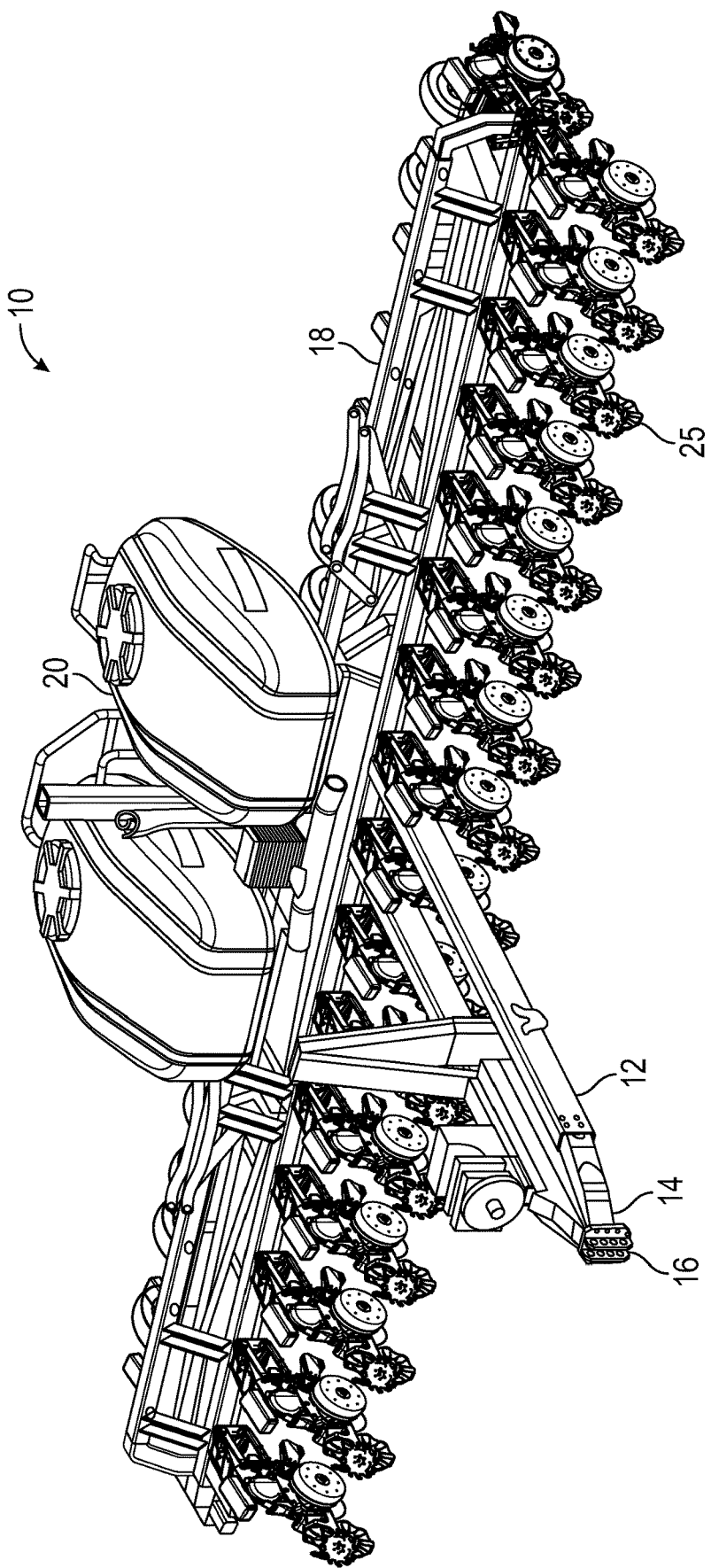
FIG. 1 is a perspective view of an agricultural planting implement.
Figure 2:
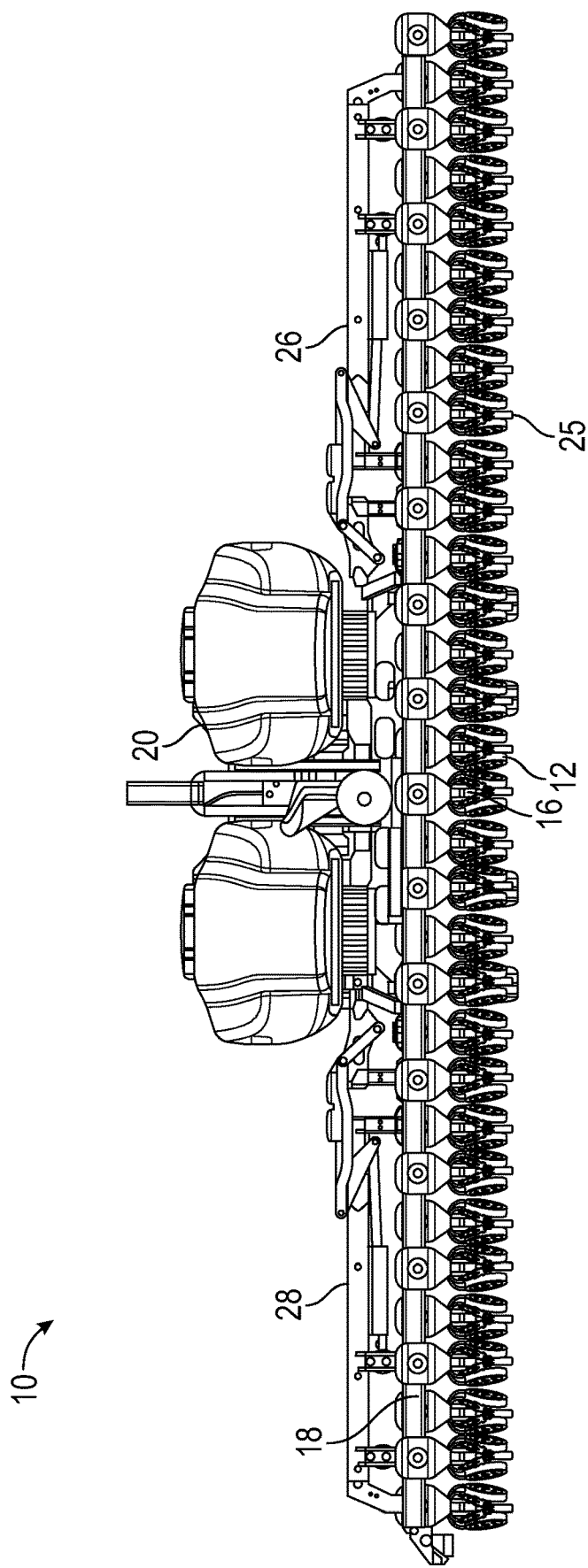
FIG. 2 is a rear elevation view of the agricultural planting implement.
Figure 3:
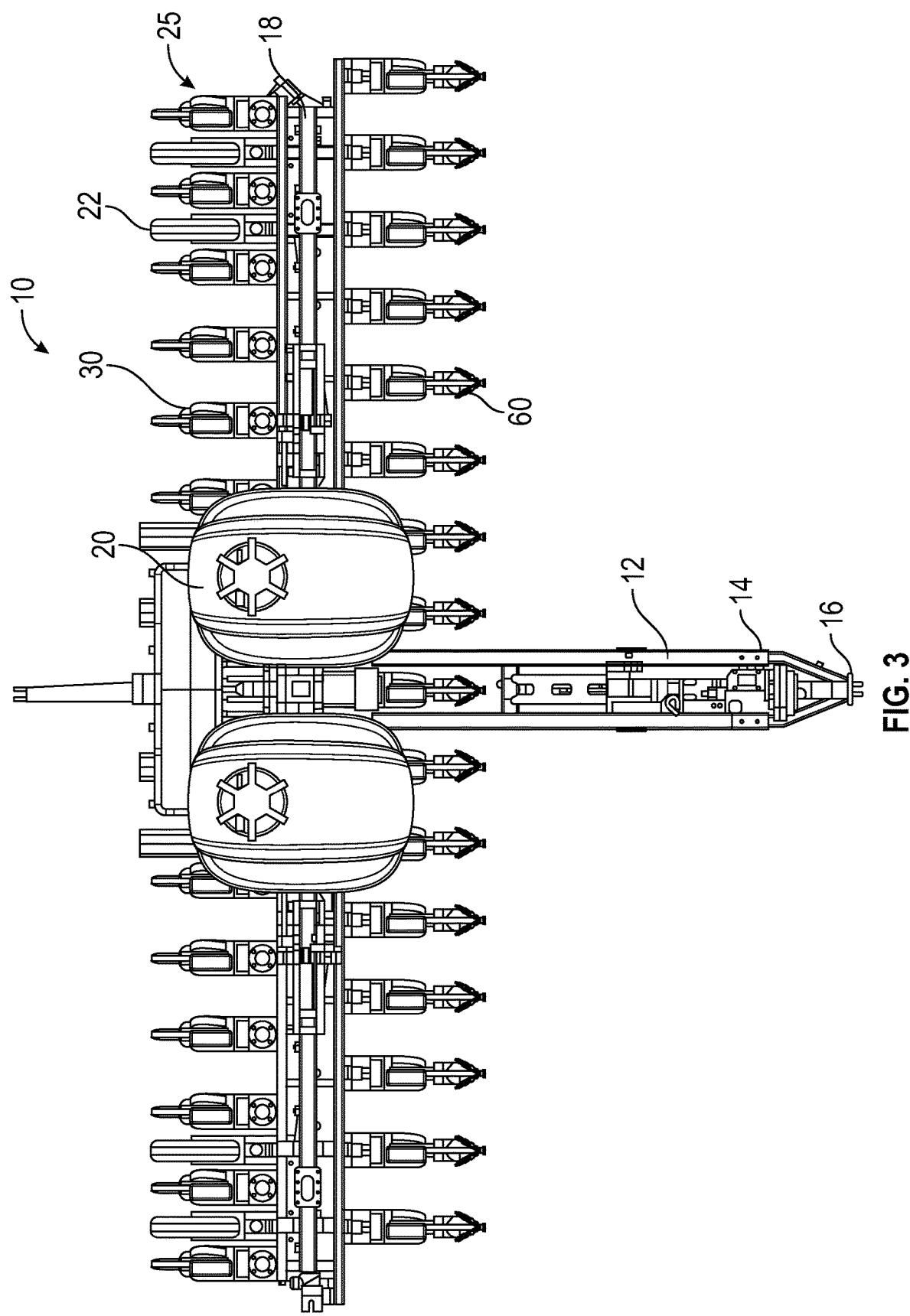
FIG. 3 is a top plan view of the agricultural planting implement.
Figure 4:
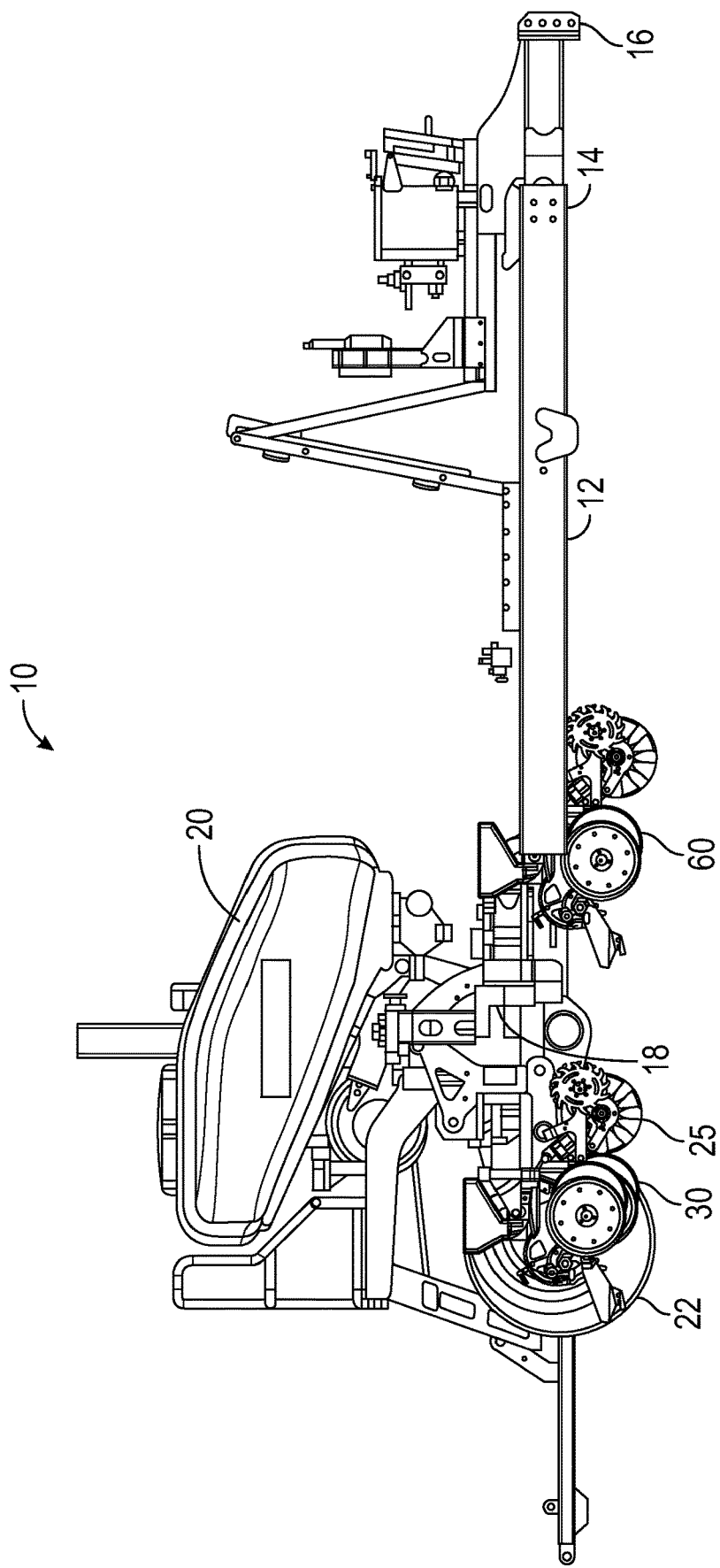
FIG. 4 is a side elevation view of the agricultural planting implement.
Figure 5:
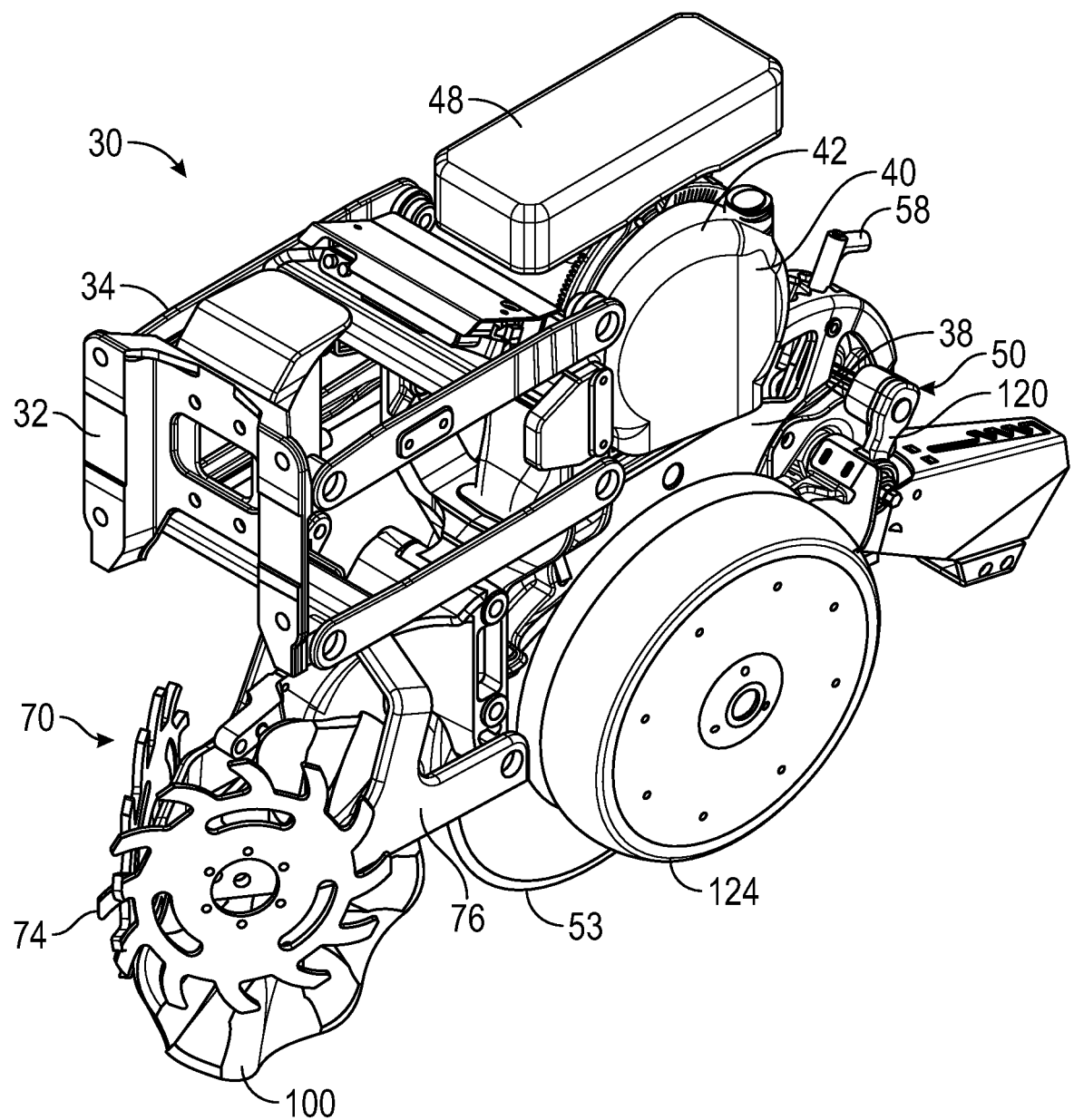
FIG. 5 is a front-left perspective view of a row unit according to aspects of the present disclosure.
Figure 6:
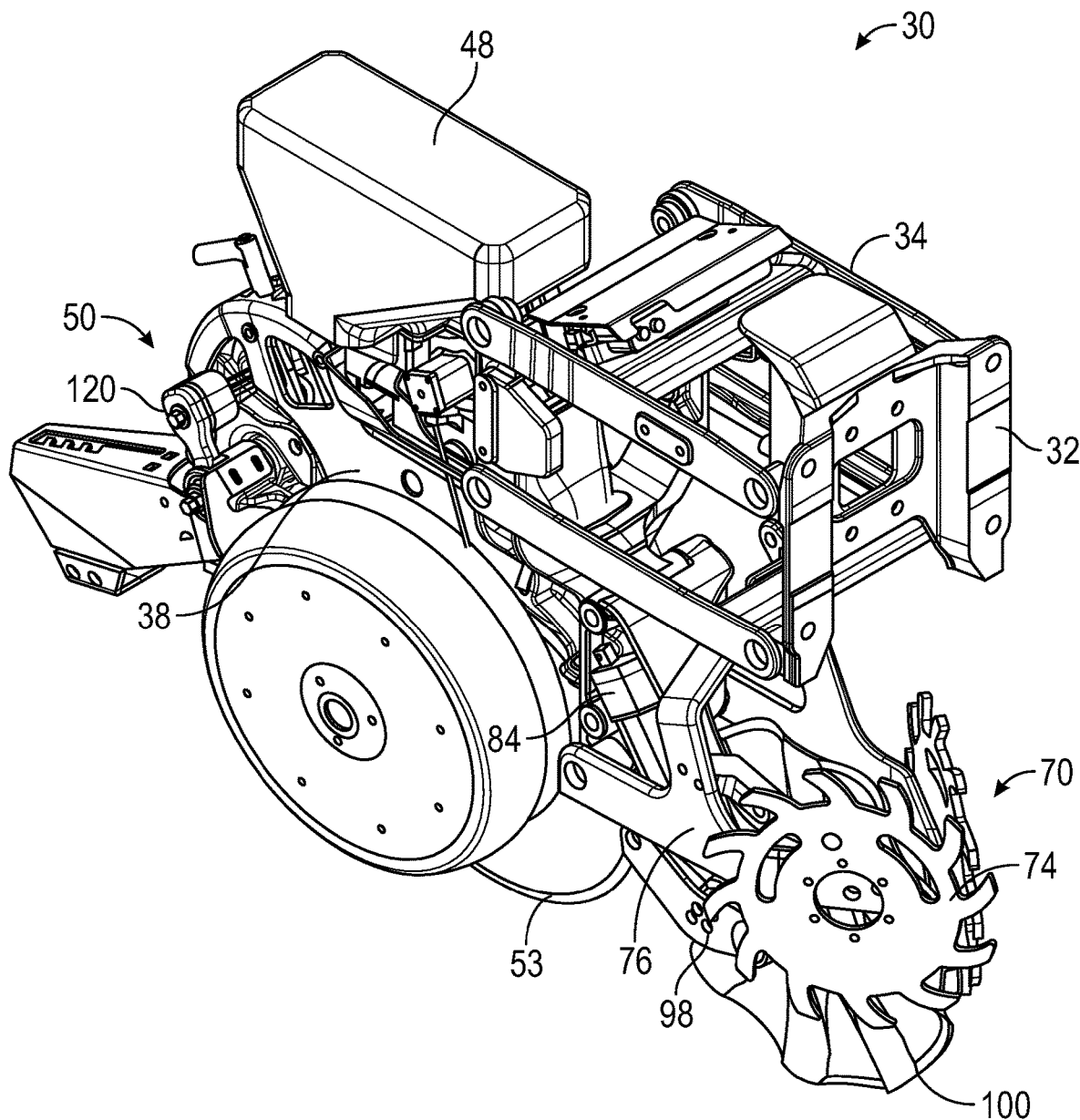
FIG. 6 is a front-right perspective view of a row unit according to aspects of the present disclosure.
Figure 7:
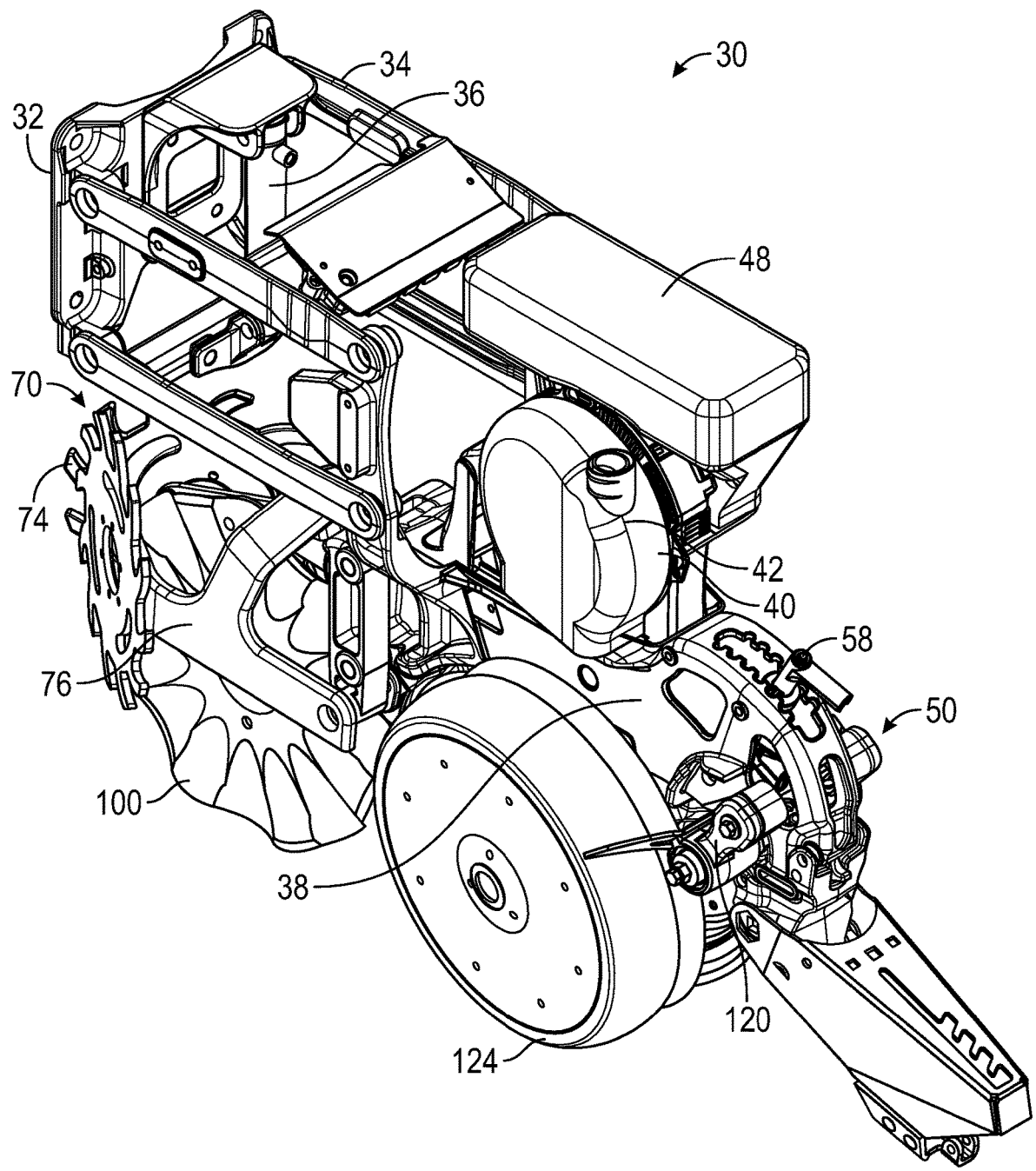
FIG. 7 is a rear-left perspective view of a row unit according to aspects of the present disclosure.
Figure 8:
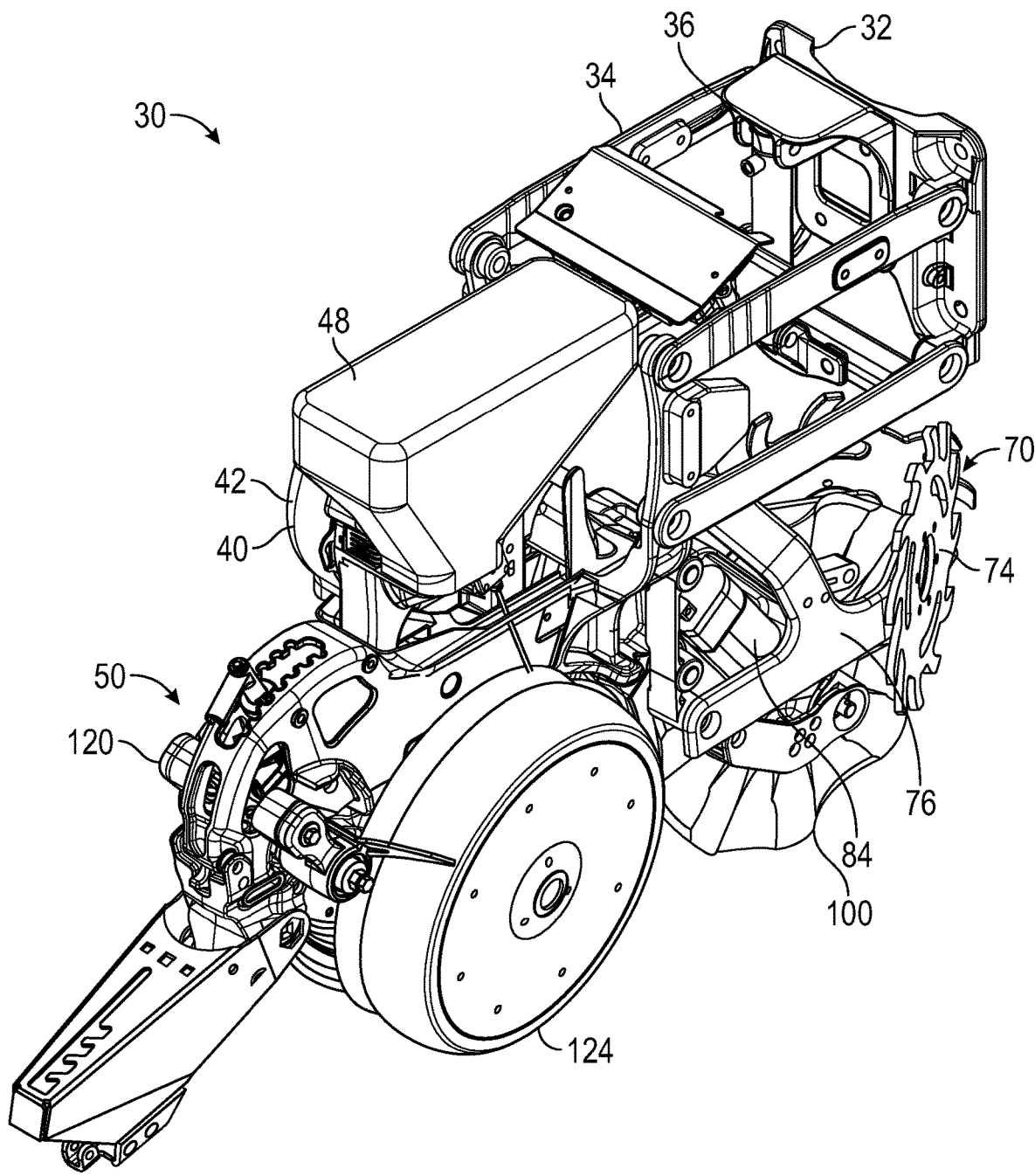
FIG. 8 is a rear-right perspective view of a row unit according to aspects of the present disclosure.
Figure 9:
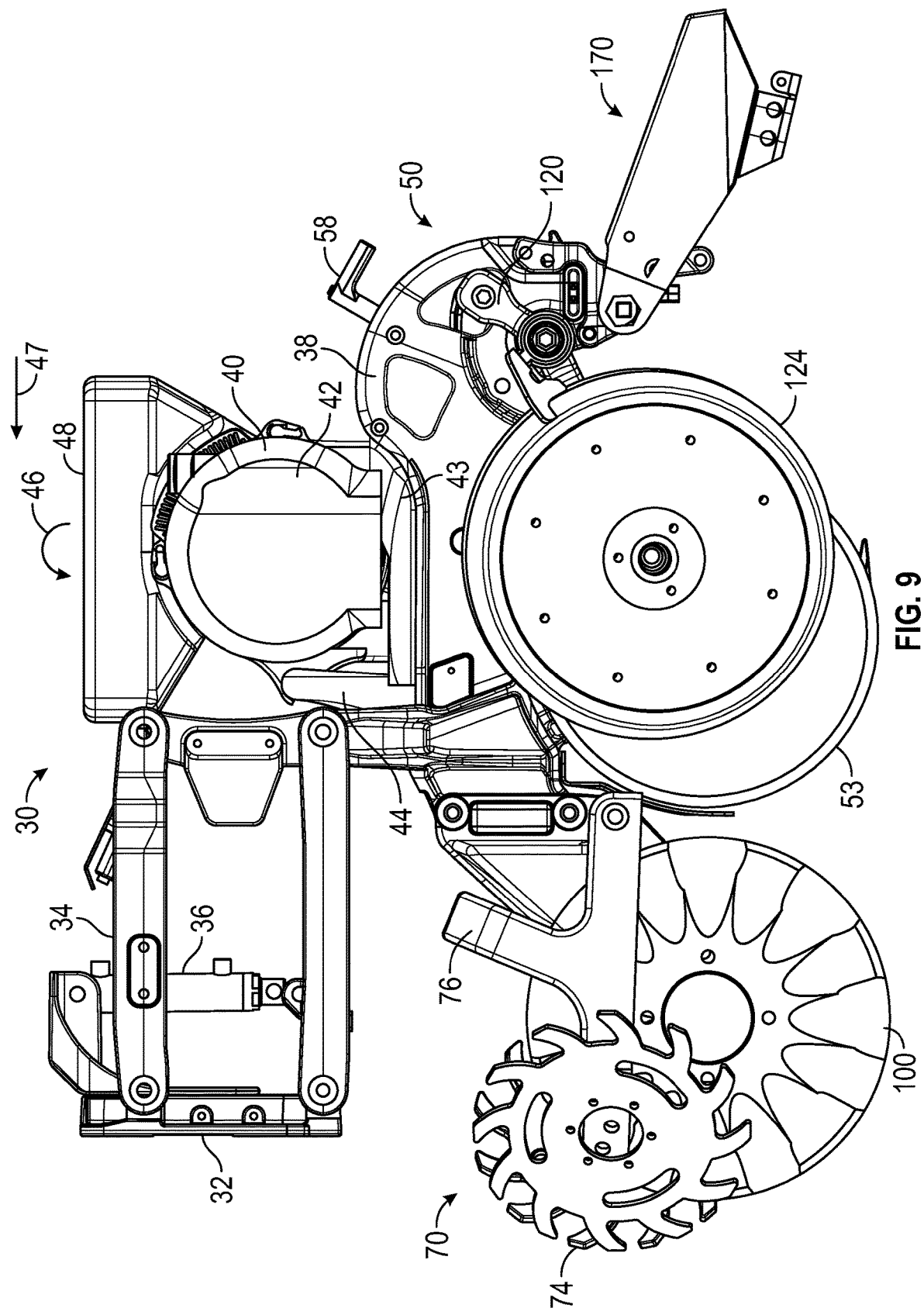
FIG. 9 is a left elevation view of a row unit according to aspects of the present disclosure.
Figure 10:
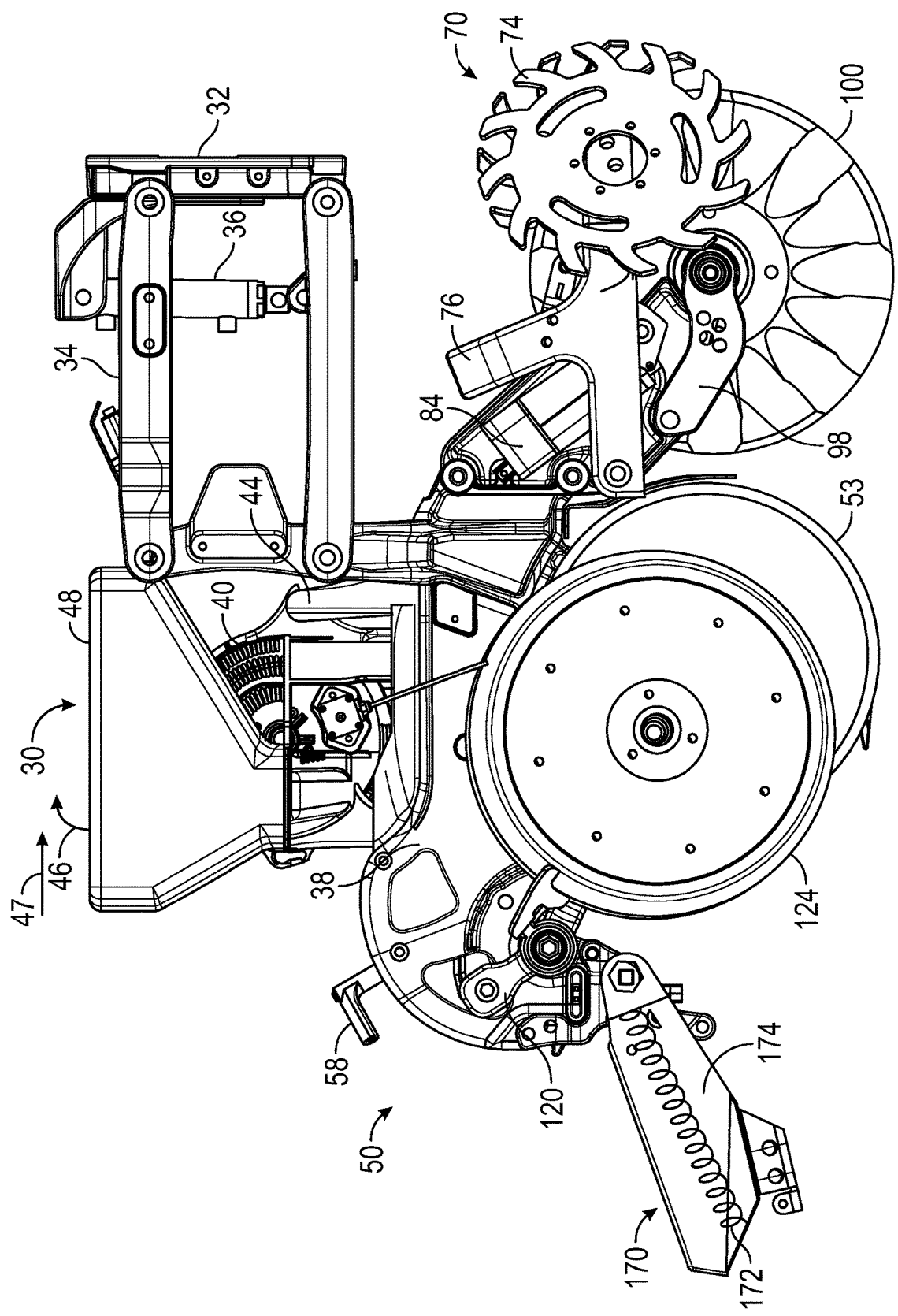
FIG. 10 is a right elevation view of a row unit according to aspects of the present disclosure.
Figure 11:
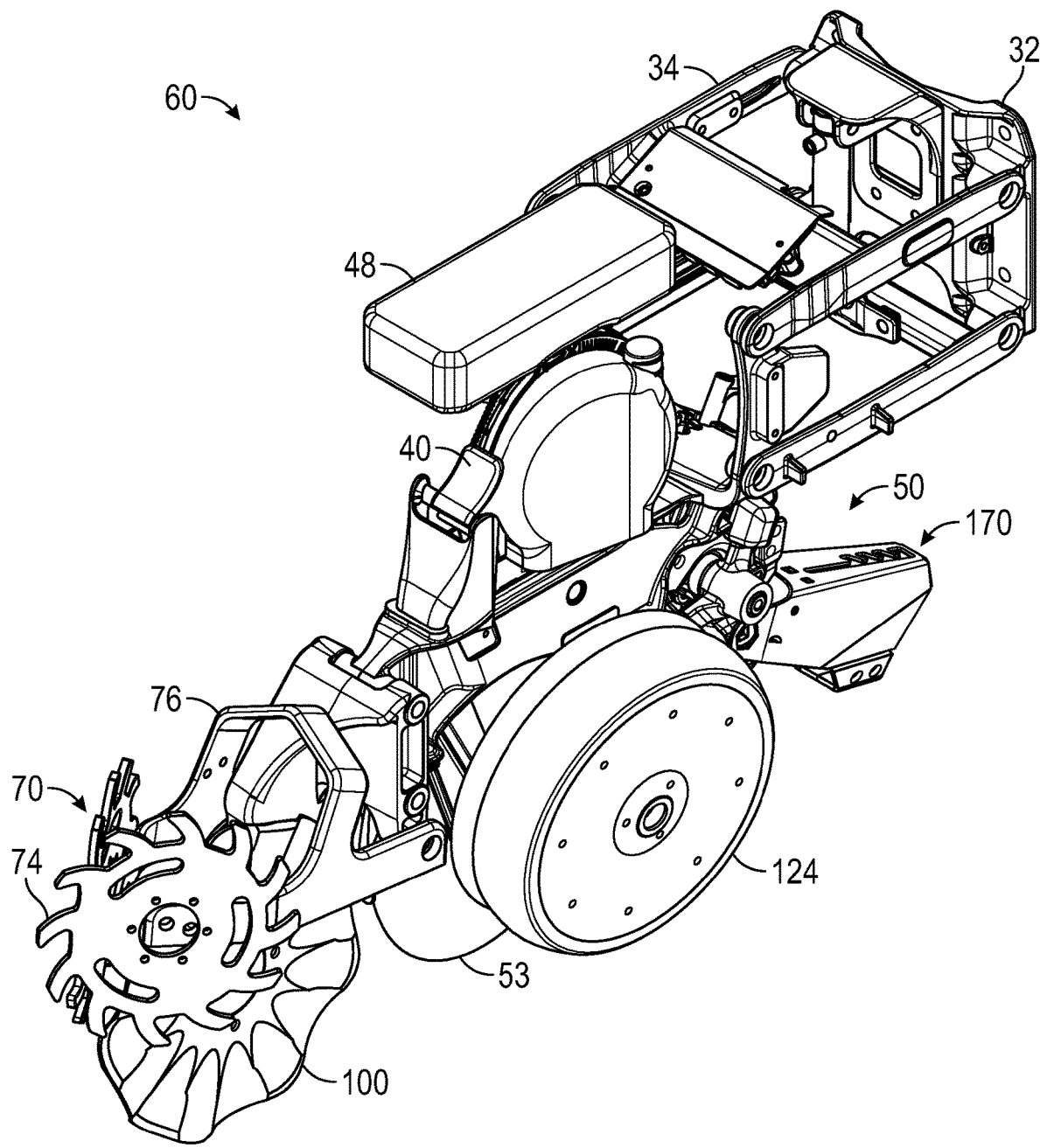
FIG. 11 is a front-left perspective view of a pusher row unit according to aspects of the present disclosure.
Figure 12:
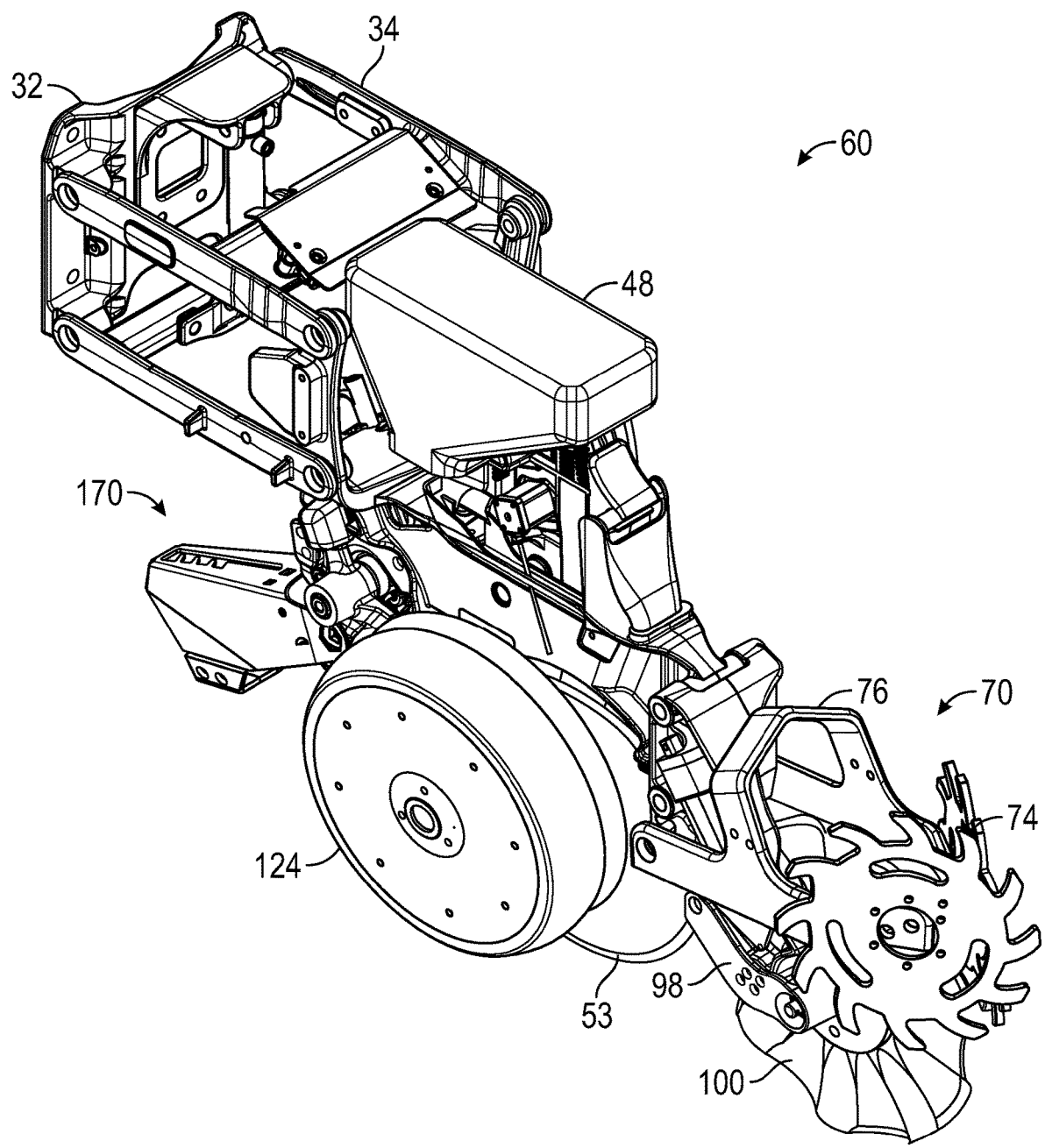
FIG. 12 is a front-right perspective view of a pusher row unit according to aspects of the present disclosure.
Figure 13:
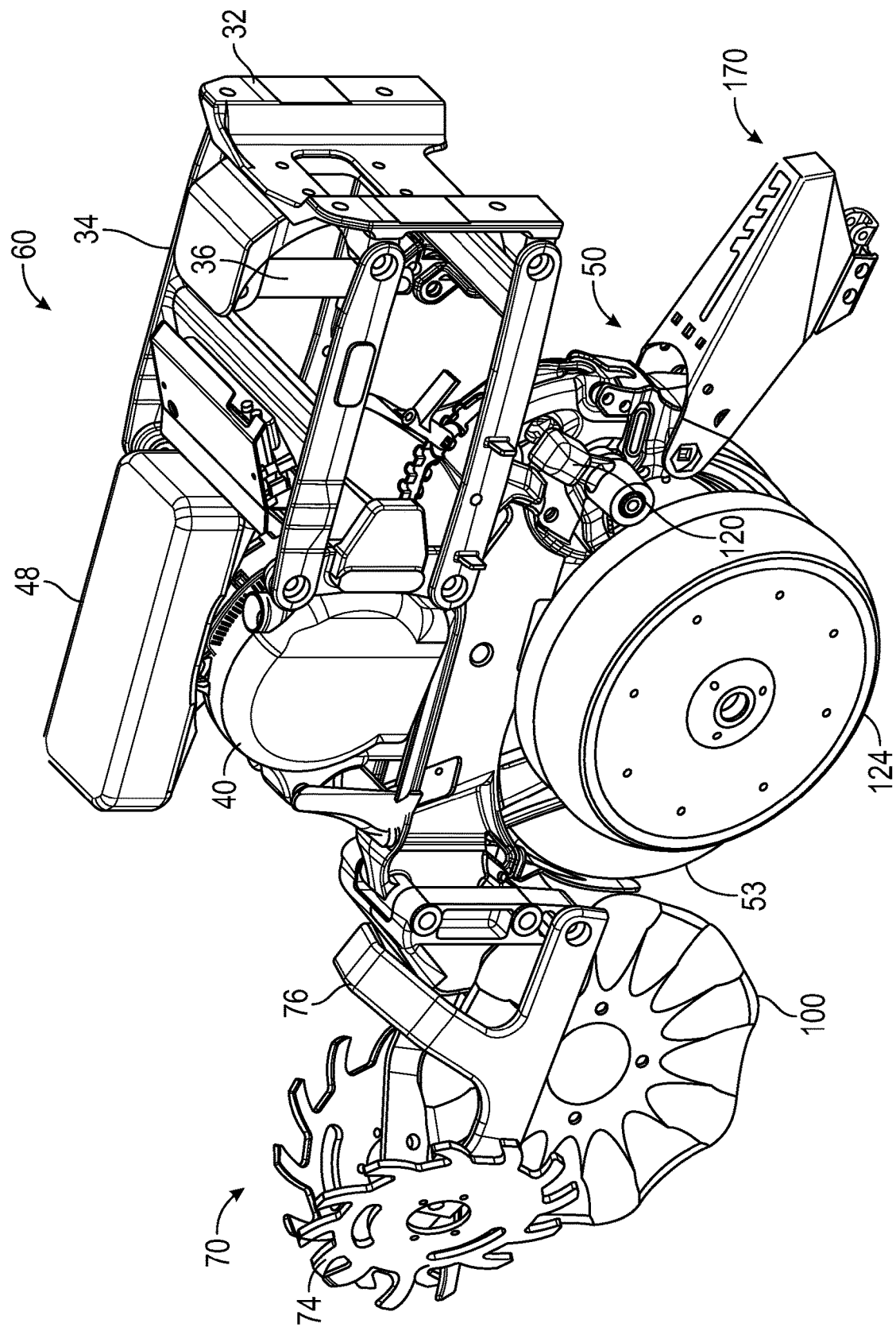
FIG. 13 is a rear-left perspective view of a pusher row unit according to aspects of the present disclosure.
Figure 14:
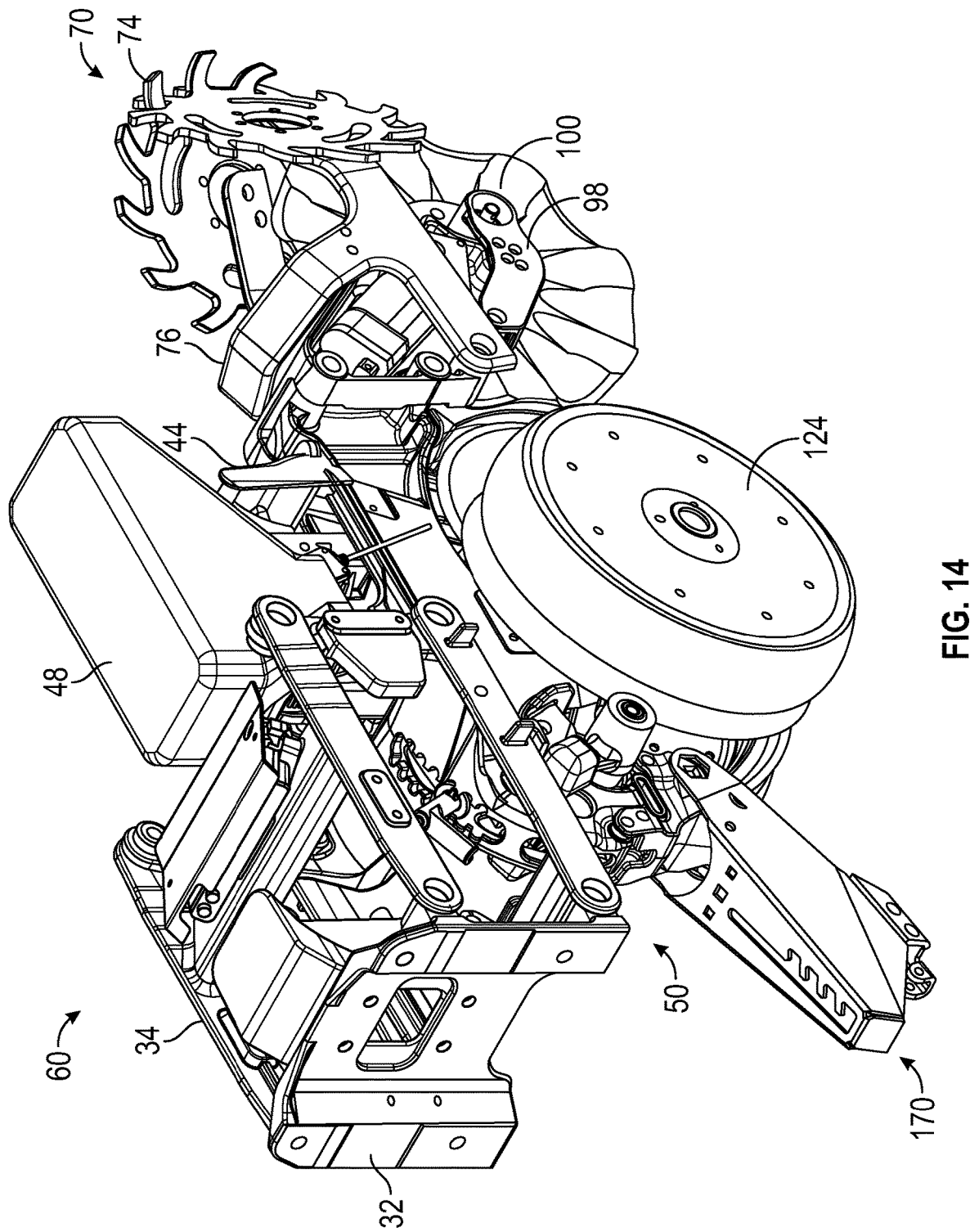
FIG. 14 is a rear-right perspective view of a pusher row unit according to aspects of the present disclosure.

An artisan of ordinary skill need not view, within isolated figure(s), the near infinite number of distinct permutations of features described in the following detailed description to facilitate an understanding of the invention.

DETAILED DESCRIPTION OF THE INVENTION

The present disclosure is not to be limited to that described herein. Mechanical, electrical, chemical, procedural, and/or other changes can be made without departing from the spirit and scope of the invention. No features shown or described are essential to permit basic operation of the invention unless otherwise indicated.

Unless defined otherwise, all technical and scientific terms used above have the same meaning as commonly understood by one of ordinary skill in the art to which embodiments of the invention pertain.

The terms "a," "an," and "the" include both singular and plural referents.

The term "or" is synonymous with "and/or" and means any one member or combination of members of a particular list.

The terms "invention" or "present invention" are not intended to refer to any single embodiment of the particular invention but encompass all possible embodiments as described in the specification and the claims.

The term "about" as used herein refer to slight variations in numerical quantities with respect to any quantifiable variable. Inadvertent error can occur, for example, through use of typical measuring techniques or equipment or from differences in the manufacture, source, or purity of components.

The term "substantially" refers to a great or significant extent. "Substantially" can thus refer to a plurality, majority, and/or a supermajority of said quantifiable variable, given proper context.

The term "generally" encompasses both "about" and "substantially."

The term "configured" describes structure capable of performing a task or adopting a particular configuration. The term "configured" can be used interchangeably with other similar phrases, such as constructed, arranged, adapted, manufactured, and the like.

Terms characterizing sequential order, a position, and/or an orientation are not limiting and are only referenced according to the views presented.

The "scope" of the invention is defined by the appended claims, along with the full scope of equivalents to which such claims are entitled. The scope of the invention is further qualified as including any possible modification to any of the aspects and/or embodiments disclosed herein which would result in other embodiments, combinations, subcombinations, or the like that would be obvious to those skilled in the art.

Accordingly, FIGS. 1-4 show aspects of an exemplary agricultural implement 10. As will be understood, many of the aspects, embodiments, and/or features disclosed herein can be used with agricultural implements, such as that disclosed in FIGS. 1-4. According to at least some embodiments and/or aspects of the invention, the implement 10 comprises an agricultural planting implement, such as a planter. The planter shown in the figures can be used for precision planting, such that ideal spacing and depth are achieved via the planter 10 and associate components, as will be described herein.

Therefore, as shown in the Figures, the implement 10 includes a tongue 12 with a first end 14 having a hitch 16 positioned thereat. A hitch is utilized to attach to a toe or prime vehicle (not shown), such as a tractor or the like. The tractor will provide additional outputs, such as electrical outputs, power take out outputs, hydraulic outputs, and the like, which can be utilized to aid in the operation of one or more of the components of the planter or other implement 10. Opposite the first end 14 of the tongue 12 is a toolbar 18. The toolbar 18 is shown to be generally transverse to the tongue. Position on the tongue 18 are hoppers 20 which are used to hold and distribute one or more particulates, such as seed, fertilizer, or the like. Furthermore, the figures show a plurality of transport wheels 22. The transport wheels are utilized to aid in moving the implement 10.

While the exemplary implement 10 is shown in the figures, it should be appreciated that it is not to be limiting on the disclosure herein. For example, the planter implement 10 shown in the figures is shown to be a lift and rotate system, in which the toolbar 18 is lifted and rotated approximately 90 degrees to be generally parallel to the tongue for a transport configuration. The figures show the planting implement 10 in a field use configuration, wherein the toolbar is transverse to the tongue 12. However, it should be appreciated that this is not the only type of implement that the invention, including any components thereof, can be utilized. For example, additional type of planters and configurations can be utilized. Such configurations can include forward folding planters, rearward folding planters, vertically folding planters, and/or any combination thereof. In addition, the toolbar 18 may comprise separate wing portions extending generally from a central toolbar portion. The wing portions can be folded forwardly, rearwardly, vertically, or otherwise. Still further, additional components that can be utilized with an implement, which are not to be limited to the invention can include such features as a particulate delivery system, fans, light, markers, hydraulics, alternators or other motors, fans, and the like. It should be appreciated that the invention as shown is provided for environmental purposes in order to provide background for the aspects of the disclosure.

Still further, the toolbar 18 and associated implement 10 include separate mounting portions for row units 25. The row units 25 are generally the ground engaging components to perform the associated agricultural operation of the implement. Such row units can include various components including seeding apparatus, metering apparatus, fertilizer application, sensing components or the like. The exact row unit may not be limiting to the invention. Still further, it is to be appreciated that the row units 25 can be pull units 30 or push units 60. As will be understood, pull units 30 are positioned generally at the rearward side of the toolbar 18 such that they will be generally trailing the toolbar as the implement 10 moves in a field during field use configuration. Likewise, the push unit 60 are positioned on a front side of the toolbar 18 such that they will be leading the toolbar during normal operations and movement of the implement. However, as will be understood, shown, and described herein, the push and pull units may be generally similar in nature and include similar components, with the individual components of the push and pull units mirrored or otherwise similar with respect to the movement of the implement 10. For example, at front location of the push unit and the pull units will be opening components and at the rear portion will be closing components with associated seeding components between in order to apply a particulate, such as seed to the field.

FIGS. 5-10 show exemplary embodiments of a pull row unit 30 according to aspects and/or embodiments of the present disclosure. As noted herein, the pull unit 30 will be generally trailing the toolbar and attached thereto to be pulled in a manner such it will generally be behind a portion of the toolbar during general use of the implement 10 in the field. The row unit 30 includes a mounting plate 32 for attaching to the toolbar 18. Extending rearwardly therefrom is a four bar other linkage 34 which allows for at least some vertical movement of the row unit of the toolbar. This will allow for continued contact with the ground as the implement 10 traverses a field with varying conditions. The exact configuration of the linkage 34 should not be limiting to that shown, and it is to be appreciated that other types of linkages may be utilized. In addition, it is to be appreciated that the linkage is not required in all instances, and instead the row unit frame or other components be attached directly to the toolbar or similar component without said linkage. Generally attached to the linkage 34 is an actuator 36, which can be a downforce actuator, upforce actuator, and/or combination thereof. As is known, such an actuator can provide a force to aid in maintaining contact with the ground engaging components of the row unit 30 as the row unit traverses a field. Exemplary types of the actuator 36 can include, but are not limited to, hydraulic actuators, pneumatic actuators, springs, air bags, electric actuators, and/or some combination thereof.

Additionally, attached to the linkage is a row unit frame 38. The row unit frame, otherwise known as a shank, is the support system for attaching many of the components of the row unit thereto. The frame comprises a generally rigid material, such as steel or other metallic materials. For example, a seed meter 40 is positioned and operatively connected to a frame for support thereat. The seed meter 40 includes a seed meter housing 42 for housing the components of the seed meter. As is known, a seed meter is utilized to singulate and/or otherwise prepare particular material for delivery on a desired basis to the field. They can further include a seed to ground system 52, such as that shown in FIG. 25. Such seed to ground delivery systems can include but are not limited to, seed tubes utilizing gravity, and/or controlled delivery systems, such as that shown and/or described in U.S. Pat. No. 10,842,072, issued Nov. 24, 2020, and which is hereby incorporated by reference in its entirety. In addition, the meter can be generally any type of metering system including, but not limited to, air seed meters such as shown in the '072 patent, or U.S. Pat. No. 10,617,056, issued Apr. 14, 2020, which is incorporated by reference in its entirety. Additional types of meters, including finger pick up meters, vacuum meters, positive pressure meters, volume metric meters, and or the like can be utilized with this system.

Figure 24:
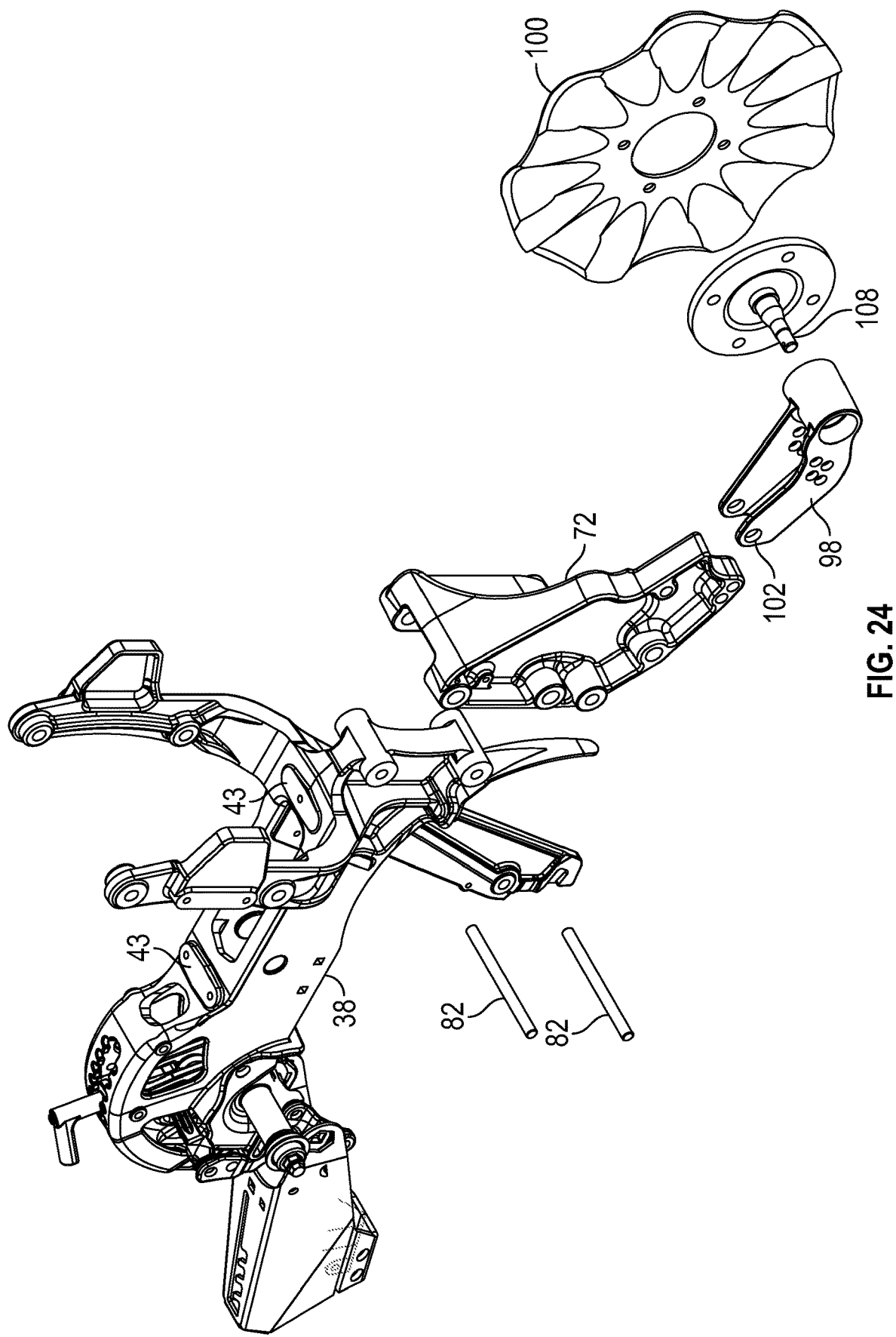
FIG. 24 is an exploded view of the no-till assembly.

An aspect of the present disclosure includes the ability to mount said metering system 40 to the frame 38 of the row unit 30 without the use of side plates or other support members. Such removal of side plates provides for easier access to the meter and other components of the row unit, as the side plates are generally rigid materials which either must be removed or otherwise navigated to provide access there behind. Such an accomplishment is provided by the pivotal attachment of the meter 40 including the meter housing 42 via the seed meter pivot 40, which is operatively positioned and/or attached to the frame 38. As is shown best in FIGS. 9 and 10, the pivot 44 includes an upstanding portion in which a receptacle of the housing 42 can be pivotable connected to the pivot 44 to allow for the seed meter 40 to pivot, such as in the direction shown by the arrows 46 in FIGS. 9 and 10 relative to the frame 38. It should be noted that the pivoting direction of the seed meter 40 is towards the direction of travel of the planting implement 10 which is indicated by the arrows 47 in FIGS. 9 and 10. The pivoting towards the direction of travel provides advantages and allows for the easy removal and/or inspection of the seed meter and other components. In addition, the pivoting of the seed meter 40 relative to the row unit frame 38 will allow for the meter to be easily and accurately aligned with the components of the frame, including the seed to ground system 52 thereof. For example, as shown best in FIG. 24, the row unit frame 38 include a meter mount base 43 in which the meter 40 can interact with a portion of the frame 38 via the mount base 43. The mount base can include such components such as pads, orientation devices, or the like, in which the meter is accurately aligned with portions of the row unit 30 in order to make sure that the seed meter and seed to ground system are accurately aligned for best operation of the row unit and metering system thereof. However, it should be appreciated that additional arms, or other components of the frame may be utilized to best align and/or orient the seed meter relative to the frame to align the seed meter with the mount 43 thereat.

Furthermore, it is shown that a hopper 48 is positioned and operatively connected to the meter 40. The hopper can be connected to the hoppers 20 of the implement 10 and/or can be stand alone hoppers for receiving particulate material, such as seed to be metered via the metering system 40 and applied to the ground via the row unit 30. For example, the hopper 48 may be referred to as a mini hopper which is connectable to an air seed delivery system for receiving amount of particulate material from the hoppers on demand basis. However, the hopper 48 can also be stand alone such that particulate material can be filled for the individual hoppers of each of the row units of the implement in order to utilize the implement and row units thereof as the implement moves through the field. However, it should be appreciated that the hoppers are operatively connected to the meter 40 such that pivoting of the meter 40 will also pivot and temporarily disconnect the hopper from the row unit frame and the associated seed to ground system as well.

Additional components of the row unit shown in FIGS. 5-10, and which will be elaborated on herein include a closing system 50 for closing a furrow created by one or more opening wheels, cultures, or the like 53 of the row unit 30. As is known, the opening system 53 is utilized to create a trough or trench in the ground, the seed meter is used to meter and distribute a particulate material such as via the seed to ground system to the trough and the closing system is provided to close said trough to ensure best planting environment or otherwise environments for the particulate material delivered by the row unit. To aid in maintaining a desired depth of the trough or other trench in the ground, gauge wheels 124 and the dept adjustment system 58 are provided. The gauge wheels are set relative to the opening system to create said furrow or other trough in the ground at the desired depth. This can be adjusted via the depth system 58, as desired. However, the gauge wheels can provide some consistency for the depth. Furthermore, the gauge wheels can be attached, via the system to the downforce actuator 36 in order to provide a downforce to the system to aid in maintaining or otherwise adding downforce to the row unit 30 in order to aid in maintaining in said depth of furrow created by the opening system 53. Furthermore, at the front side of the row unit 30 is a row cleaning assembly in system 70.

Still further, at the front end of the row unit 30 is a row cleaning assembly 70. The row cleaning assembly, as will be understood, includes such components as a row cleaner 74 and/or residue wheel 100 (also referred to as a coulter wheel). It should be appreciated that both of the components are not required for the row cleaning assembly in all embodiments. The components of the row cleaning assembly are utilized to aid in removing trash or other debris in front of the row unit so as to provide easier access for the opening system to create said furrow of desired depth in the field as the implement moves therethrough. For example, as farming practices moved towards no till or reduced till practices, it becomes more difficult for an opening system to create the desired furrow with the untilled land. Therefore, the row cleaner and/or residue wheel can provide a clearer path in front of the opening system to allow for the opening system to have access to the ground for providing the furrow therein.

Figure 15:
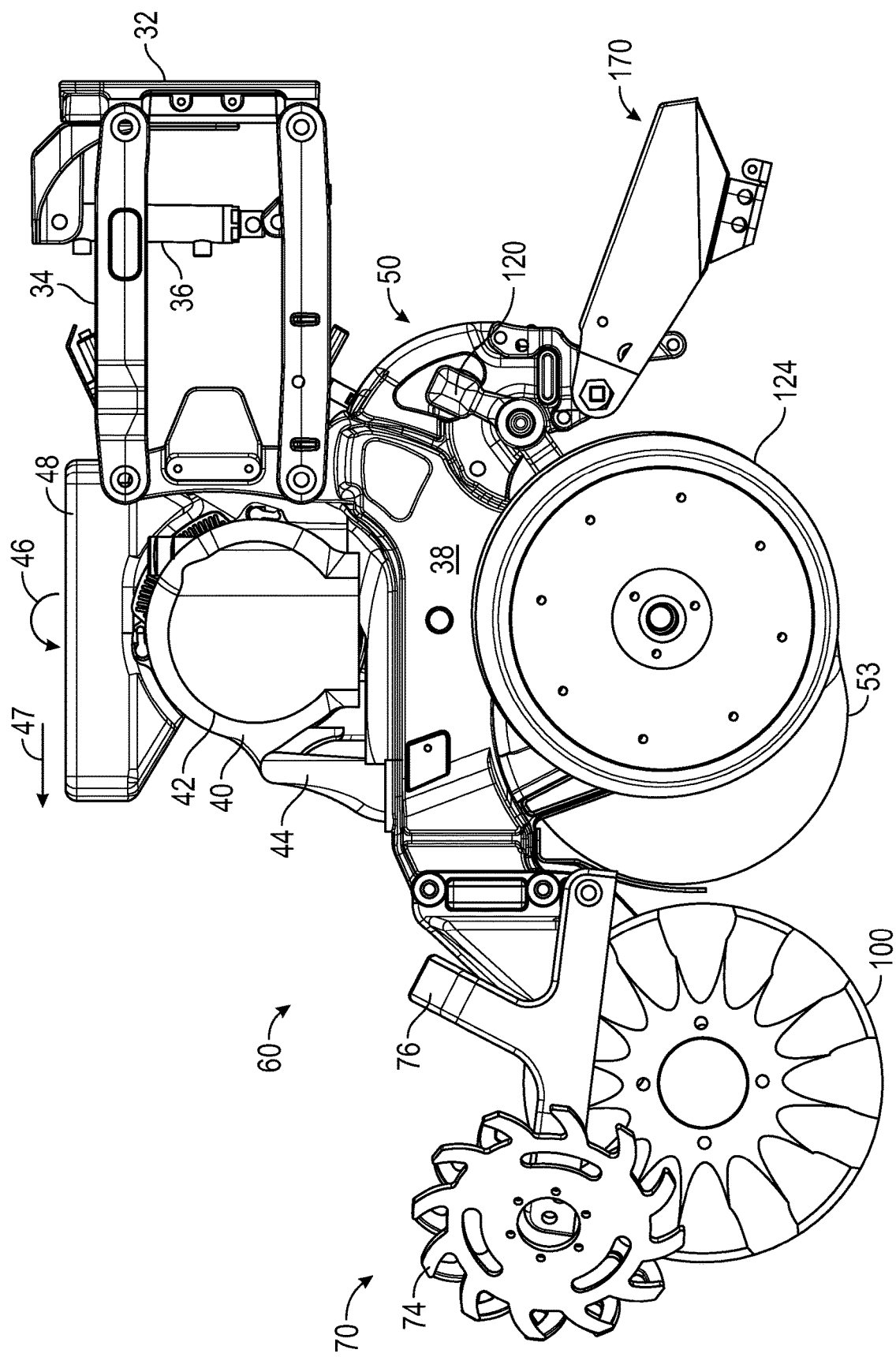
FIG. 15 is a left elevation view of a pusher row unit according to aspects of the present disclosure.
Figure 16:
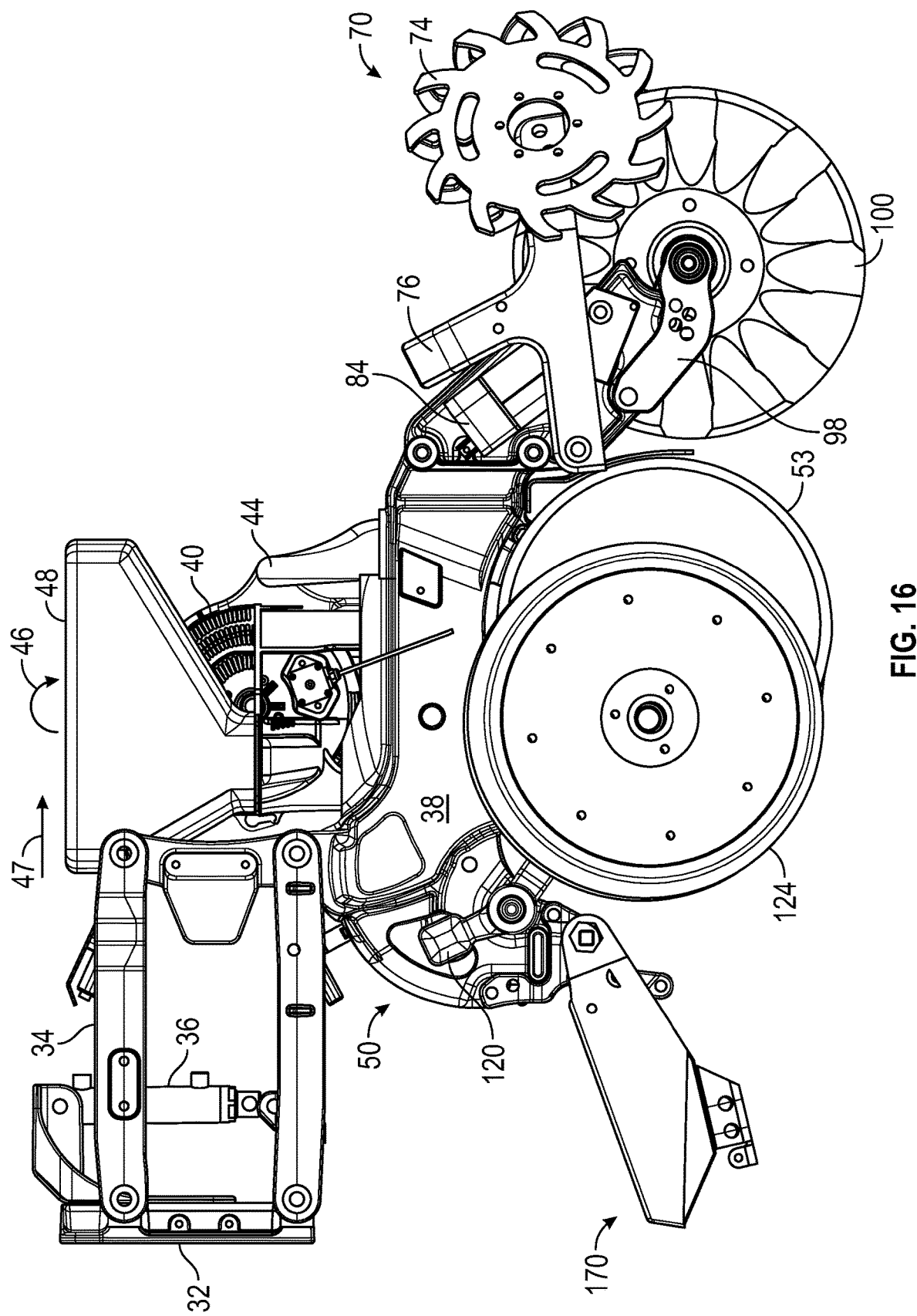
FIG. 16 is a right elevation view of a pusher row unit according to aspects of the present disclosure.

FIGS. 11-16 show exemplary embodiments of a push unit 60. As noted, the implement 10 includes a plurality of row units spaced along the toolbar 18. The row units include a plurality of pull units and a plurality of push units 60. As further indicted, the push unit 60 include generally many of the same components of the pull unit 30, however they are reversed in nature. For example, as is shown in the figures, the push unit 60 includes a face plate 32. However, the face plate 32 will be generally positioned at the rearward side of the push unit 60. This is shown best in FIG. 15, where the direction of travel 47 is provided by the arrow 47 with the face plate 32 at the right side, which is the rear of the push unit 60. The remaining of the components remain the same however they will be in front of the face plate 32, linkage 34, and remainder of the components of the row unit 60. As noted, the linkage 34 and downforce actuator 36 remain. As does the row unit frame 38, opening wheels 53 and meter 40 with associated seed to ground delivery system 53. One aspect of the push unit 60, similar to the pull unit 30, includes the attachment of the seed meter 40 and associated hopper 48 without the use of side plates and in a pivotal manner. This is provided by the pivot point 44, which is a component extending generally upwardly from the frame 38. The housing 42 of the meter 40 includes a portion to allow the housing to be rotatably or otherwise pivotably attached to the attachment 44. This allows for the seed meter and associated hopper 40, 48 to be pivoted relative to the frame 38 in the direction of the arrow 46 as shown in FIGS. 15 and 16. This is generally towards the direction of travel, which is indicated by the arrow 47 in FIGS. 15 and 16. Therefore, regardless of the type of row unit, push or pull, the seed meter will be pivotably attached such that it pivots towards the direction of travel of the implement 10. This will still allow for easy access to the meter and the associate components of the row unit. Otherwise, the additional component of the row unit 60 are similar to that of the row unit 30, just in a reversed manner. However, for disclosure purposes, it should be understood that the components are the same and need not be repeated herein.

FIGS. 17-21 show aspects of the row cleaning system 70 as has been previously shown and/or described here. As indicted, the row cleaner assembly 70 is utilized to aid in removing trash or other debris in front of the row unit as it moves through the field in order to aid in creating the furrow with the opening system as desired. However, it should be appreciated that there are times when one or more aspects of the row cleaner system 70, including either or both of the row cleaner 74 and/or residual wheel 100 may not need to be in contact with the ground. This can be either in transport modes or in fields where there is little to no debris such as in a tilled field. Therefore, aspects of the present disclosure include the ability and improvements on moving one or more aspects of the row cleaner system 70 in a generally vertical manner relative to the ground, and pivotably connected to the frame 38 of the row unit.

As shown in the figures, the row cleaner system 70 includes a row cleaner carriage 76. The row cleaner carriage 76 includes carriage arms 78 with an arch 79 connecting them. This is shown best in FIG. 21. As is shown best in FIG. 21, there are two arms 78 on opposite sides with the arch 79 transversed to the arms in connecting them. Still further, the arms have distal ends 80 which may be also referred to as carriage cleaner arms. The carriage cleaner arms are generally angled towards one another with the row cleaners 74 mounted thereto. This creates a v shaped portion at the front side of the carriage 76 with the row cleaner 74 generally angled or otherwise oriented towards one another. This aids in giving the trash or other debris from in front of the system and moving it outwardly away from the midsection of the row unit as it transports through the field, which will move the trash and other debris away from the opening wheels which are generally positioned at or near a mid point of the row unit. The exact configuration of the row cleaners 74 are not dispositive on the present disclosure and therefore it is to be appreciated that any type of wheels including tines or no tines can be considered part of the present disclosure.

Additionally, as is shown in the figures, an actuator 84 is upwardly connected between the frame 38 of the row unit 30-60 and the carriage 76 of the row cleaner assembly 70. The actuator 84 may take many forms, including an electrical linear actuator, hydraulic actuator, pneumatic actuator, or the like. The actuator will be connected operatively to the frame 38 and the carriage 76 so as to provide the rotation and translated vertical movement of the carriage 76 and corresponding cleaner wheel 74 attached thereto. For example, an exemplary embodiment of the present disclosure provides that the actuator 84 is an electrical linear actuator. The actuator includes a first end or connection 86 where it is rotatably connected to a portion of the frame 38. This can be the pin, nut, bolt, or the like. The actuator 84 includes a housing with a rod 88 extending therefrom. As is known with actuators, the rod will extend or retract via the housing of the actuator 84. A portion of the rod 88 includes a connection point 89 in a form of an aperture, wherein the rod is connected to a cam 90. A cam is further connected to a portion of a row cleaner frame 72. The cam 90 includes a corresponding connection point 89 for connecting in a rotatable manner to the rod 88 of the actuator 84. In addition, the cam 90 includes a secondary connection point 94 for connecting to a portion of the subframe 72 to allow for rotational movement relative to the frame 72. Still further, the cam 90 includes a cam profile 92 which is configured to interact with a roller arm 96 positioned on the carriage 76 of the row cleaner assembly. As will be understood, the interaction of the cam profile 92 and the roller arm 96 will provide for vertical movement of the carriage 76 based on extension and retraction of the rod 88 of the actuator 84.

As is known, cams can be a rotating piece in a mechanical linkage that is used to transform rotary motion into generally linear motions. Therefore, as will be understood, the rotation of the cam 90 via the extension and retraction of the rod 88 of the actuator 84 will result in general linear movement of the carriage 76 to lift and/or lower said carriage in corresponding clearer wheels 74.

Therefore, the residue wheel location can be determined by the stroke of the actuator, which can be controlled by a linear potentiometer on the actuator or a rotary encoder on the cam.

Figure 17:
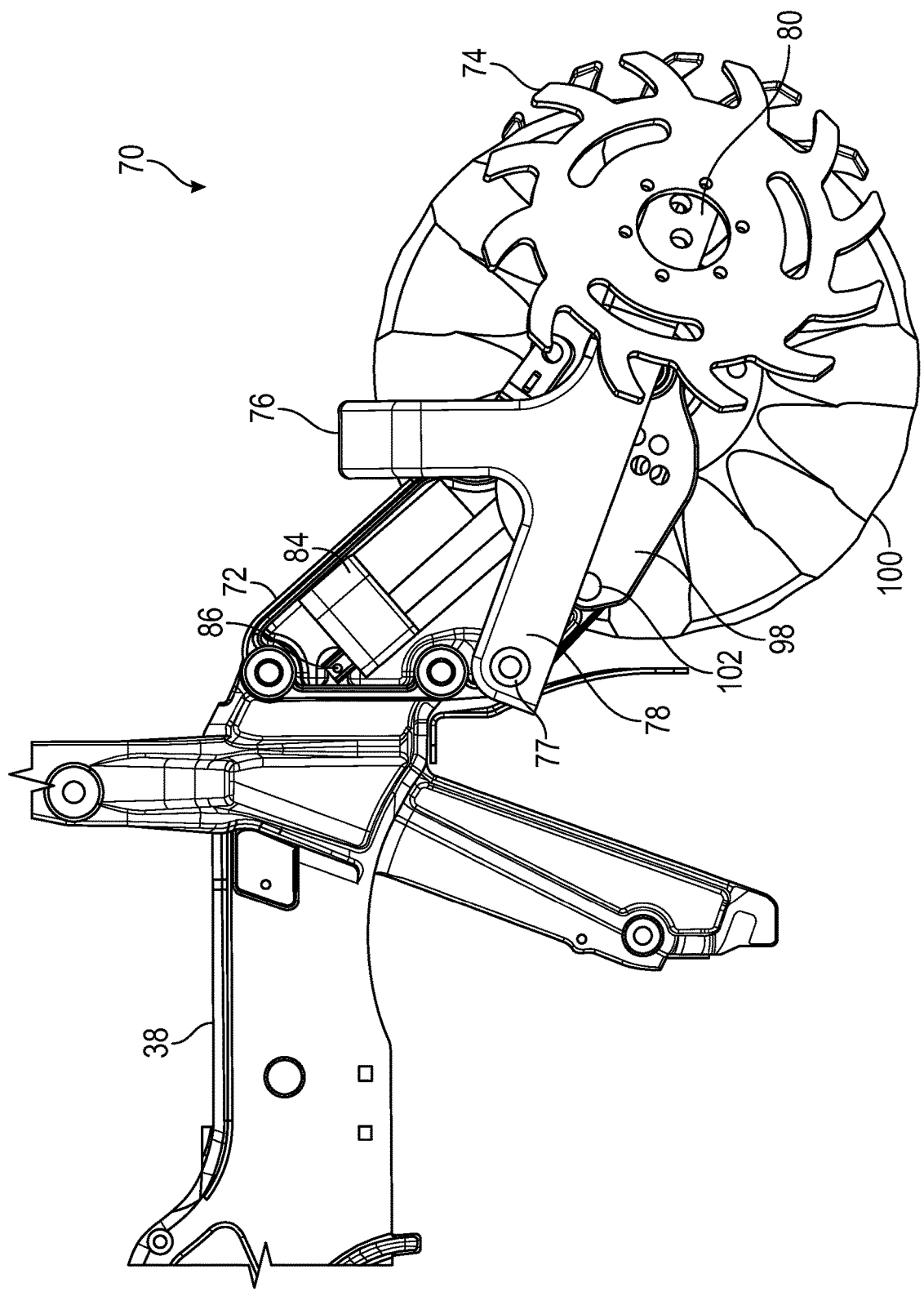
FIG. 17 is an enlarged view of a lowered row cleaner for use with a row unit according to aspects of the present disclosure.
Figure 18:
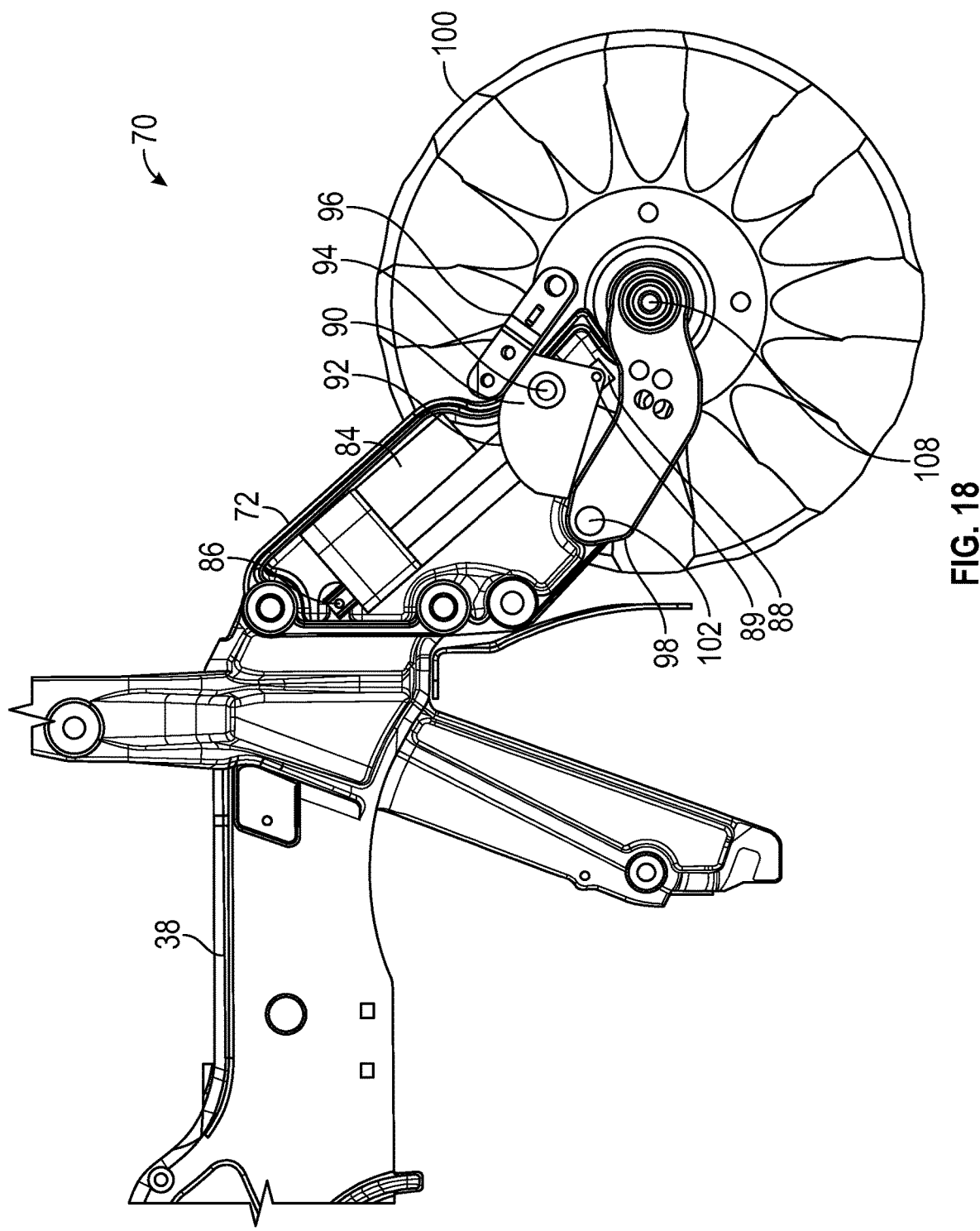
FIG. 18 is a view of FIG. 17 with a row cleaner arm removed.
Figure 19:
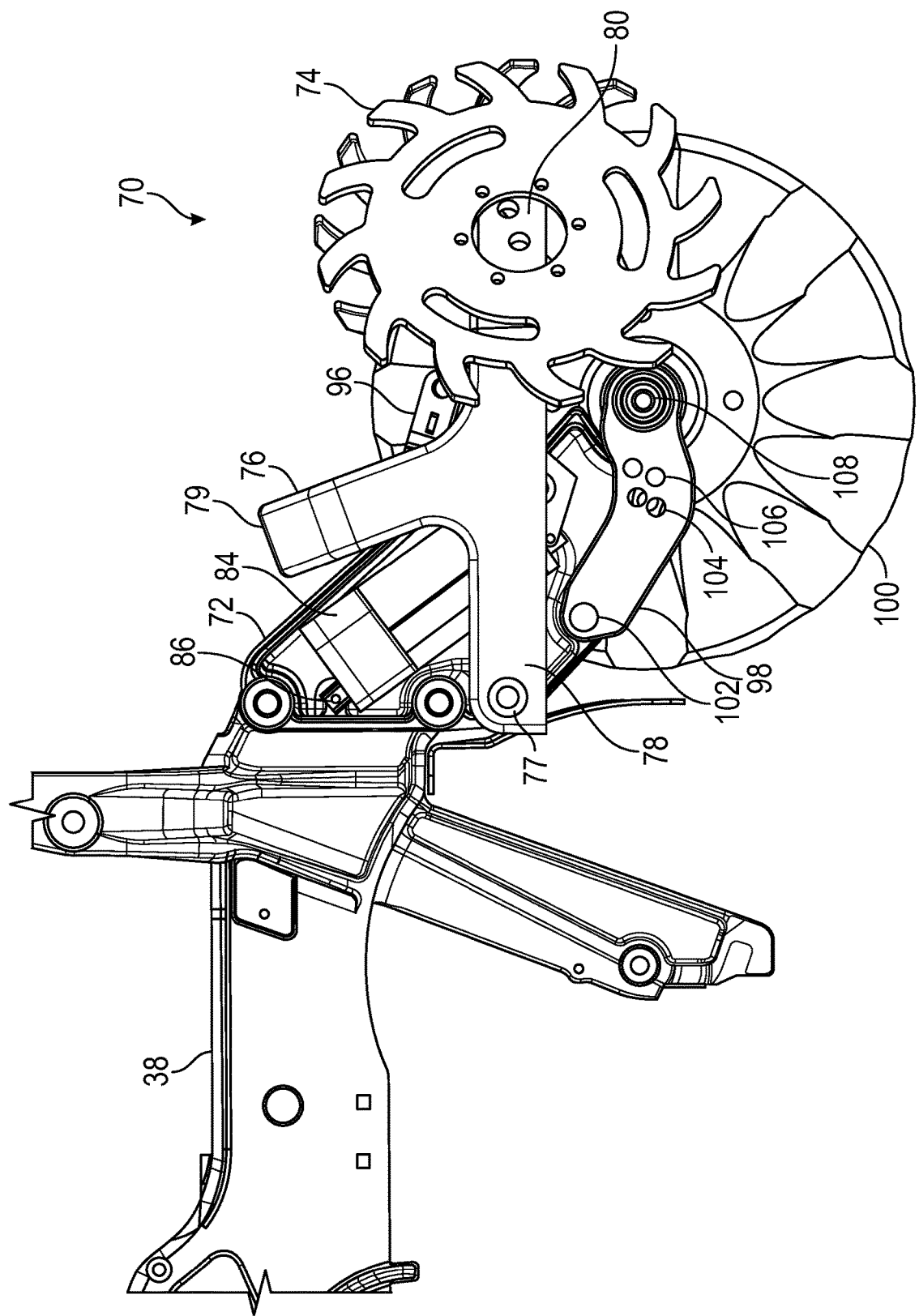
FIG. 19 is a view of FIG. 17 in a raised position.
Figure 20:
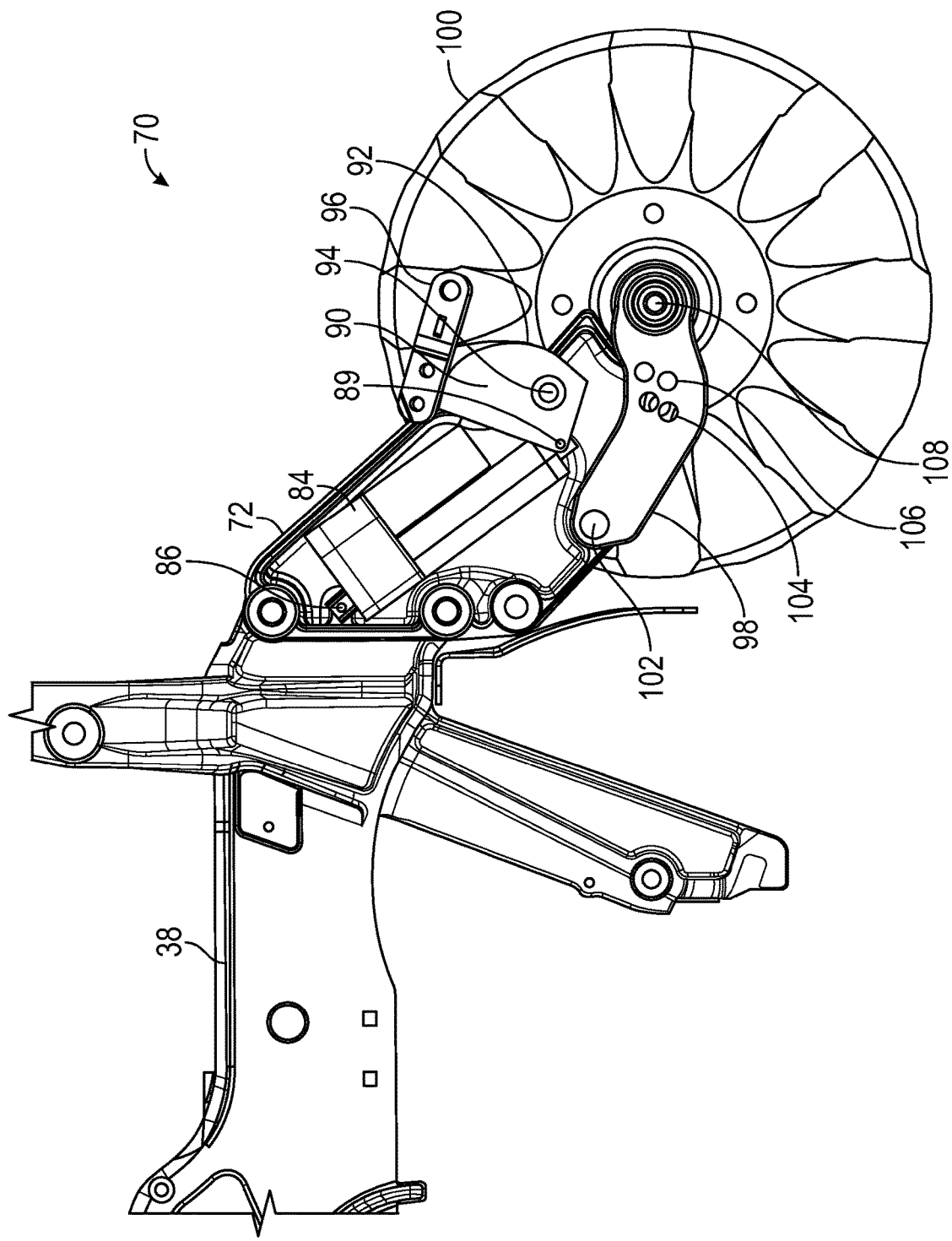
FIG. 20 is a view of FIG. 19 with a row cleaner arm removed.
Figure 21:
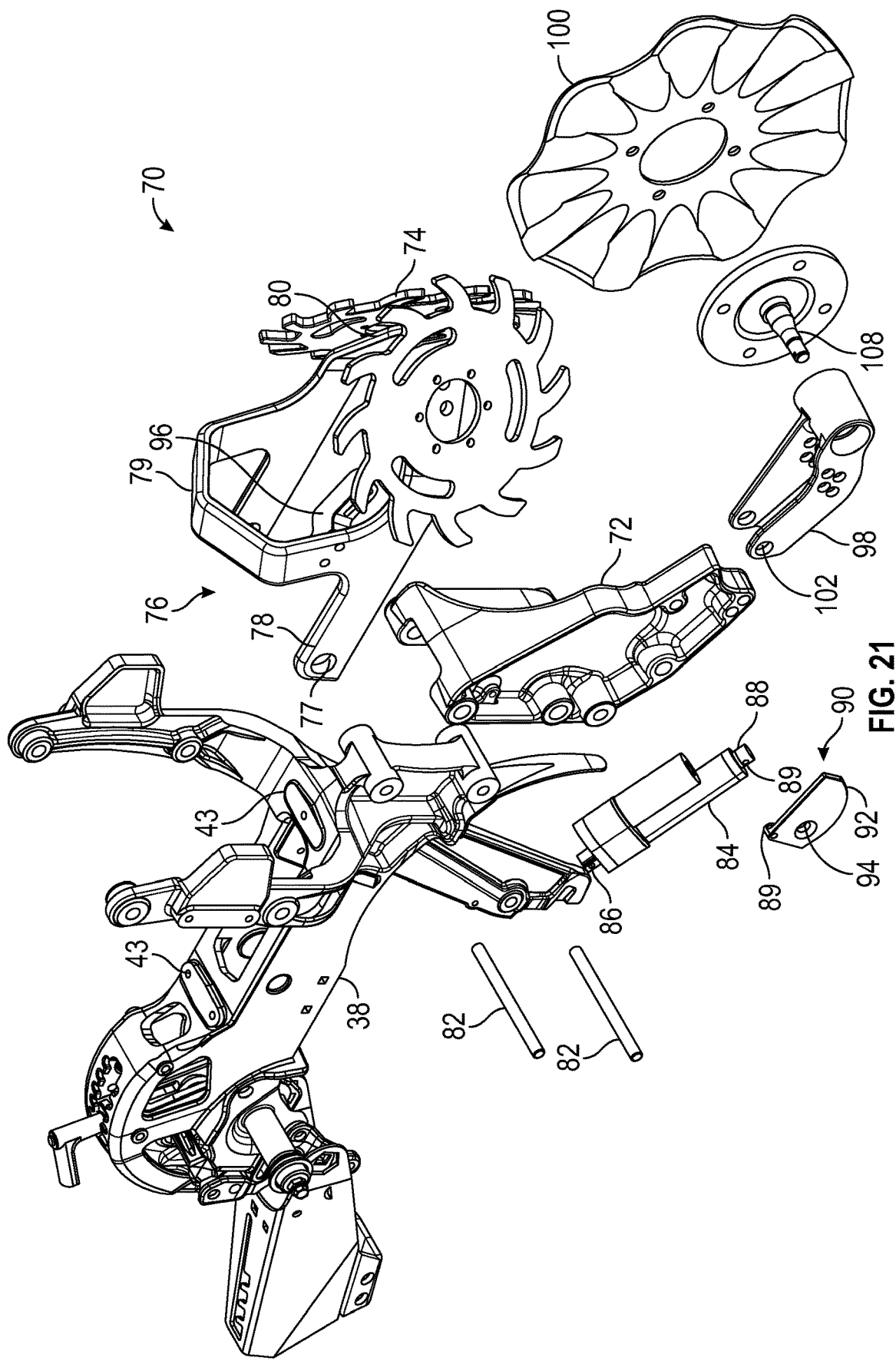
FIG. 21 is an exploded view of a row cleaner assembly according to aspects of the present disclosure.
Figure 22:
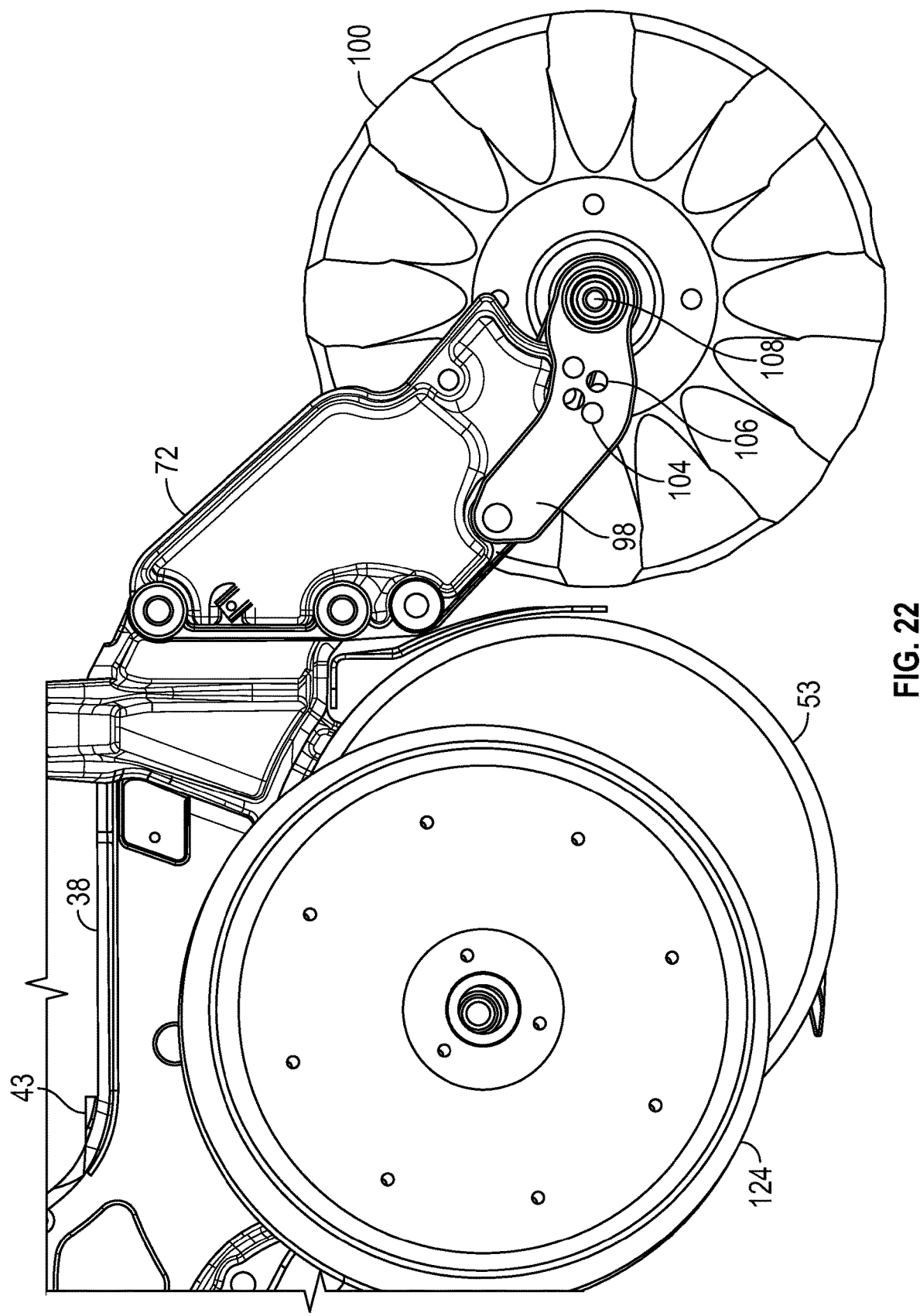
FIG. 22 is an enlarged view of a no-till coulter assembly in a lowered position according to aspects of the present disclosure.
Figure 23:
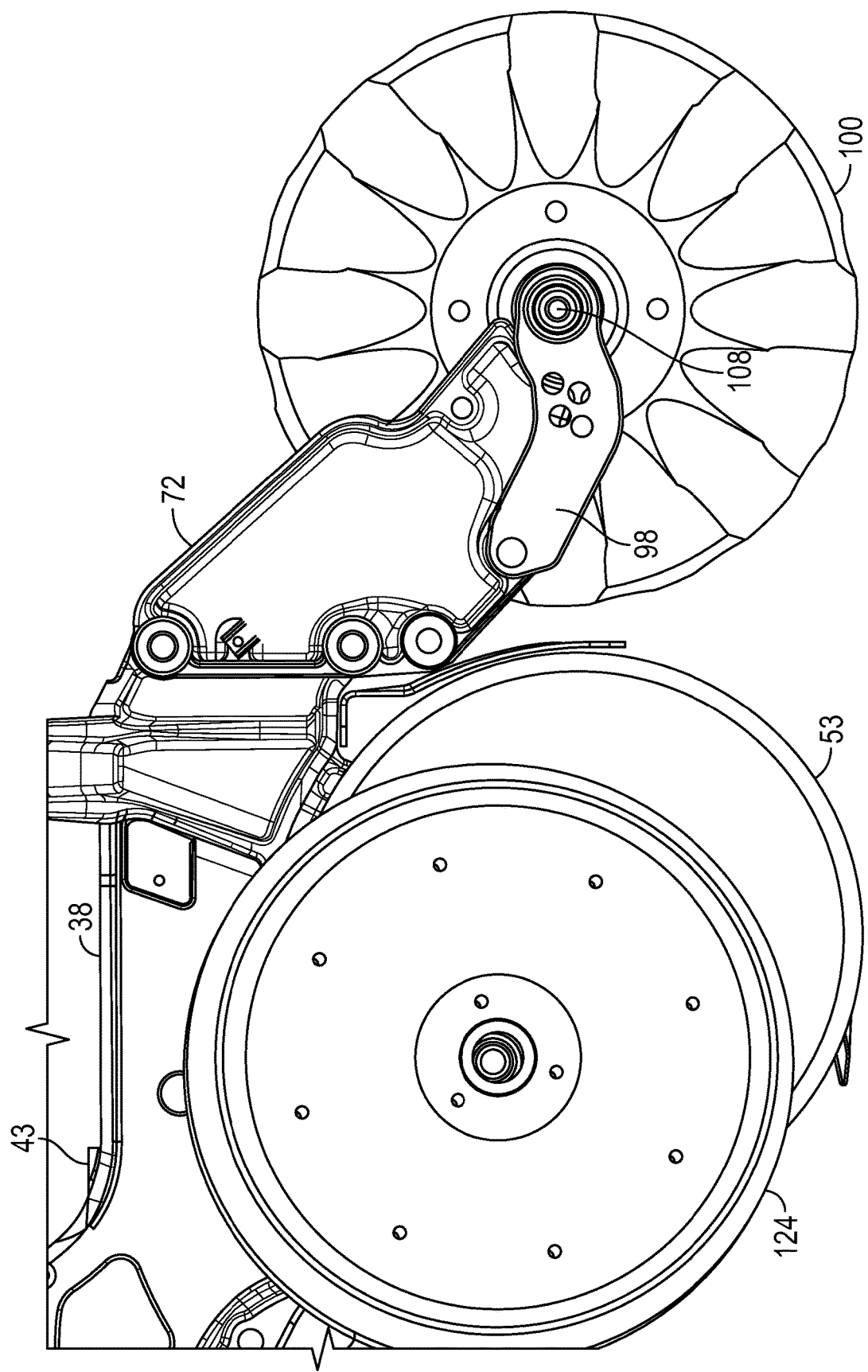
FIG. 23 is a view of the no-till coulter assembly of FIG. 22 in a raised position.

FIGS. 17 and 18 show the carriage 76 of the row cleaner system in a lowered position. In such lowered position, the rod 88 of the actuator 84 is extended and therefore the cam 90 has been rotated generally in a counterclockwise rotation as shown in FIG. 18. Such a rotation of the cam 90 causes engagement of the cam profile 92 relative to the roller arm 96 of the carriage 76. Due to the cam profile, as shown in the figures, the cam profile and roller arm engagement will lower the carriage 76 such that the cleaner wheel 74 are in general engagement with the ground. However, it may be desired to raise said carriage 76 to move the cleaner wheel 74 out of engagement of the ground. To move from the lower position to the raised position, the rod 88 of the actuator 84 is retracted. Such retraction will also move the cam 90 as the cam 90 and rod 88 are connected via connection point 89. Such movement at the location of the cam 89 will cause the cam 92 to rotate. Such rotation will be in generally the clockwise direction moving from FIG. 18 to FIG. 20. Still further, the cause of the profile of the cam 90, the rotation of the cam will act or otherwise engage the roller arm 96 associated with the carriage 76. Such engagement will translate the vertical movement of the cam 90 via the pin 94 into a generally linear movement of the carriage system wherein the carriage system will rotate about the pin 77 to raise the carriage and associated cleaner wheels 74. In other words, the corresponding movement of the cam and roller end engagement with the roller arm 96 will cause the carriage 76 to rotate about the pin 77 in a general counterclockwise movement from FIG. 17 to FIG. 19, which will essentially raise the cleaner wheels 74. In order to relower the wheels 74 via the carriage 76, the rod 88 of the actuator 84 can be once again extended. This extension will cause the cam 90 to rotate in the counterclockwise direction via the pin 94. The cam profile 92 will interact with the roller arm 96 of the carriage to allow for corresponding rotation of the carriage 76 via the pin 77 in a clockwise manner, which will essentially lower the cleaning wheels 74 at the distal end of the carriage 76 such that they can be positioned adjacent the ground.

The use of the electrical linear actuator 84 with the row cleaner system 70 as shown and described provides numerous advantages. The linear actuator being electric can be operably connected to a user interface of the system in order to provide for accurate and quick movement to raise or lower the row cleaner system via the linear actuator. In addition, the linear actuator provides for near infinite adjustment of the system as electrical linear actuators can be quickly, easily, and also accurately moved. Thus, the movement of the rod of the actuator and corresponding rotation of the cam profile will allow for near infinite adjustment of the row cleaner system include the position of the row cleaner 74 thereof.

Additional components of the row cleaner system 70 are shown in FIGS. 21-24. This includes the inclusion of a residue wheel 100 which is connected to the frame 72 of the row cleaner system 70 via the residue arm 98. The residue arm 98 includes a first connection point 102 for connecting to the subframe 72 and a distal aperture for connecting an axle 108 of the residue or culture wheel 100. Aspects of the invention include adjustment of the culture wheel via multiple apertures which are shown as apertures 106 and 104 in the figures. Such apertures allow for quick and easy access and adjustability of the culture or wheel residue 100. In addition, the attachment 102 of the residue arm 98 to the frame 72 allows for quick and easy attachment or replacement or removal of the residue wheel 100 thereby.

Figure 25:
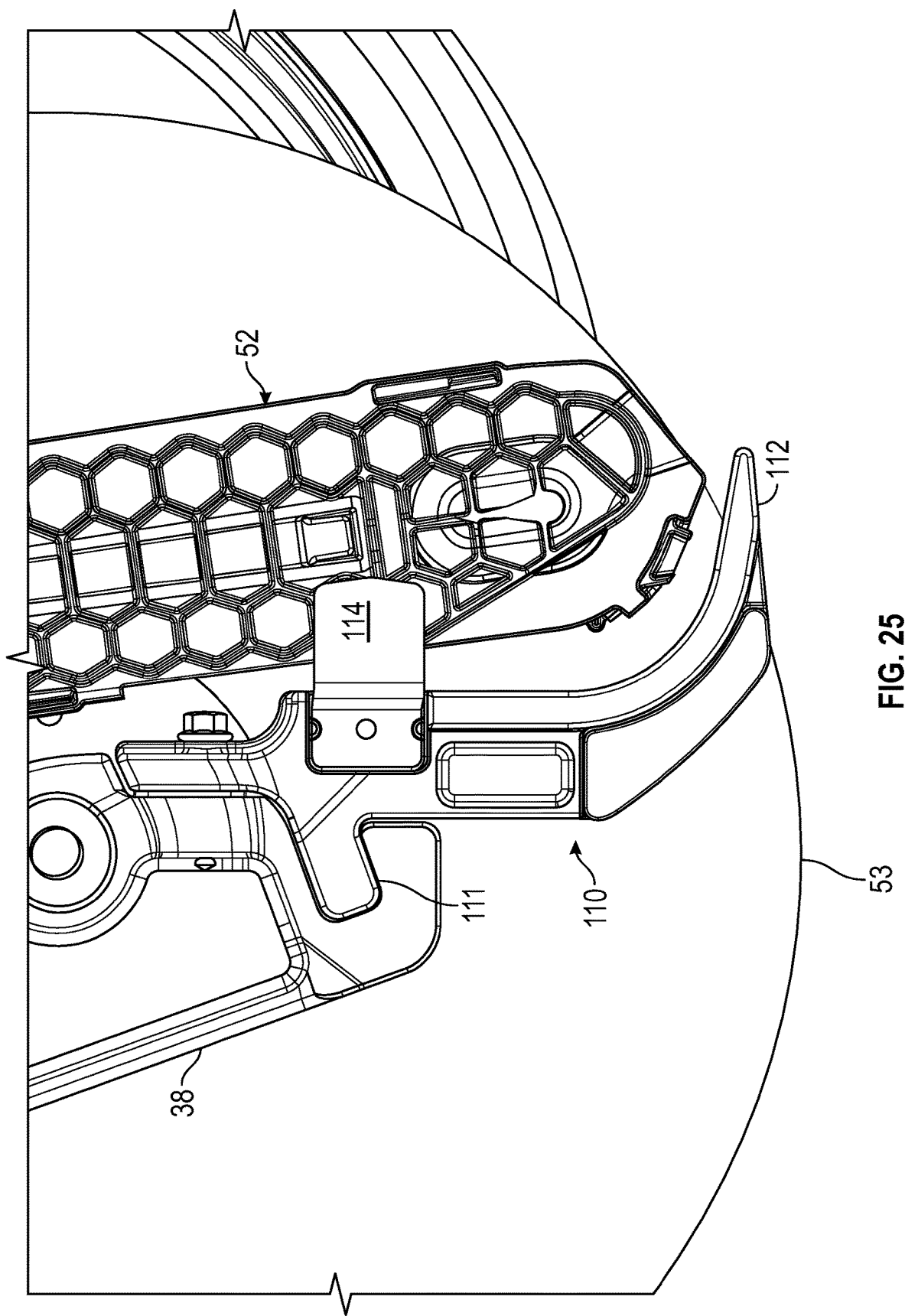
FIG. 25 is an enlarged view of a disc scraper assembly according to aspects of the present disclosure.
Figure 26:
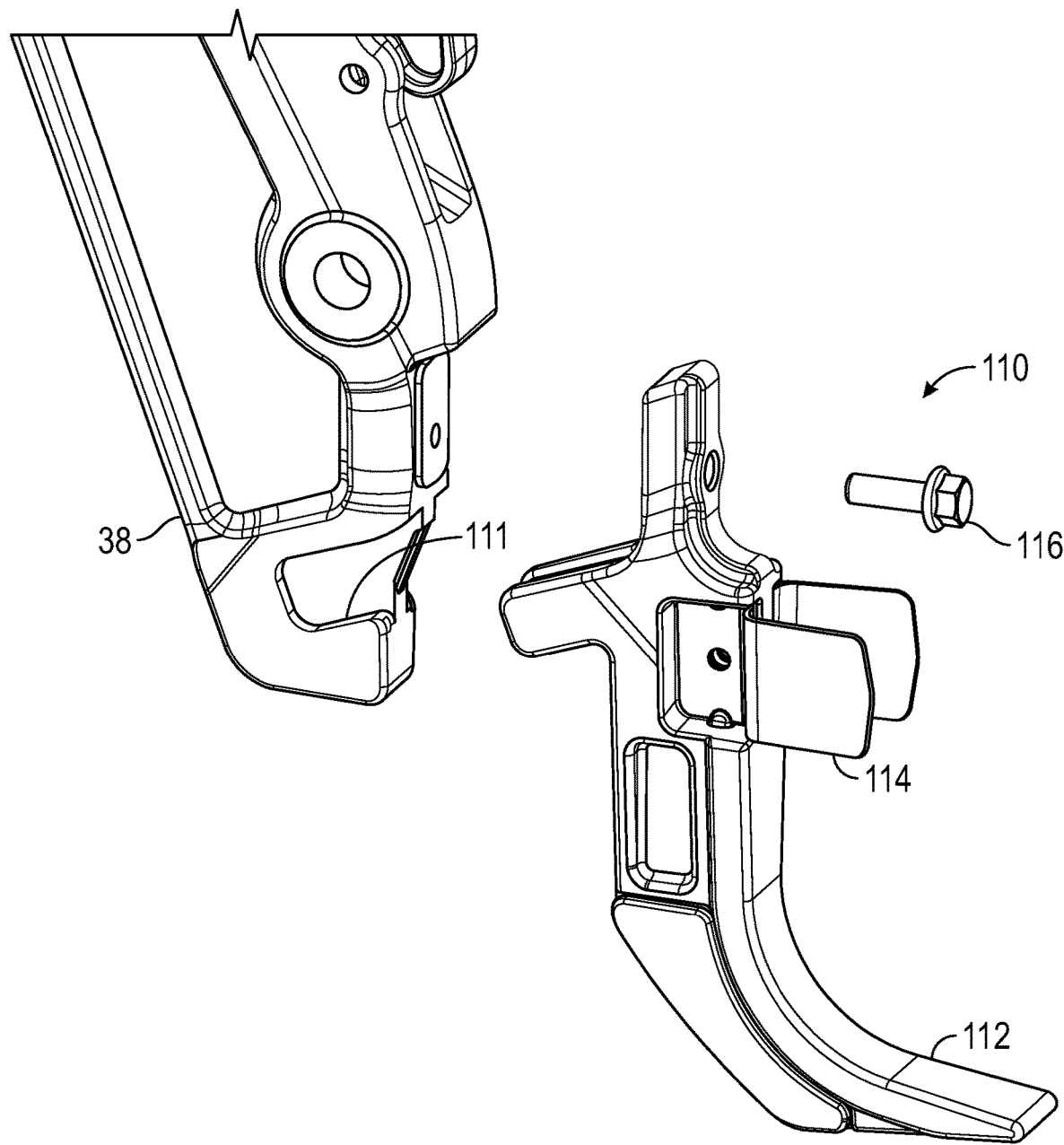
FIG. 26 is an exploded view of the disc scraper assembly of FIG. 25.
Figure 27:
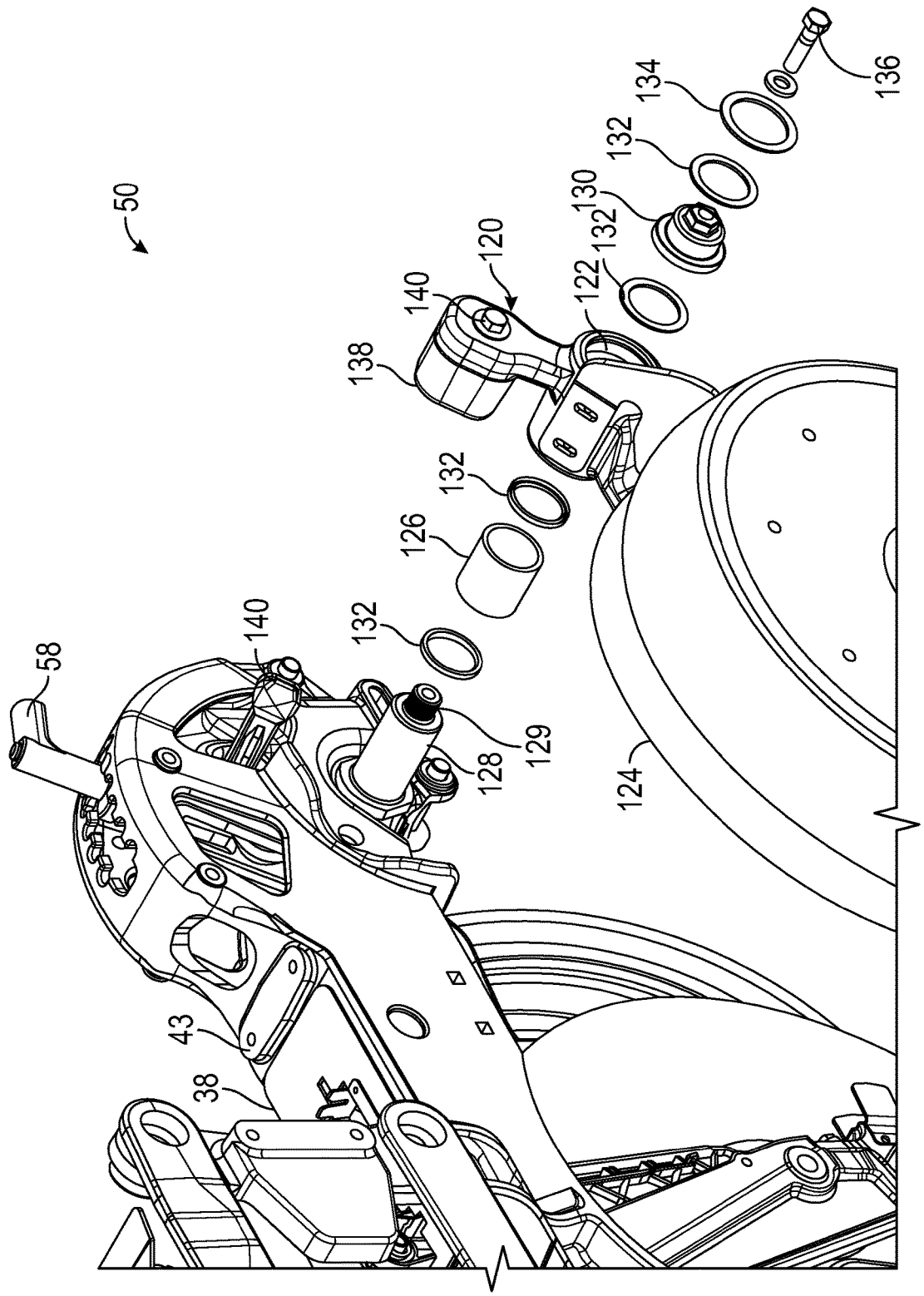
FIG. 27 is an exploded view of a gauge wheel assembly according to aspects of the present disclosure.
Figure 28:
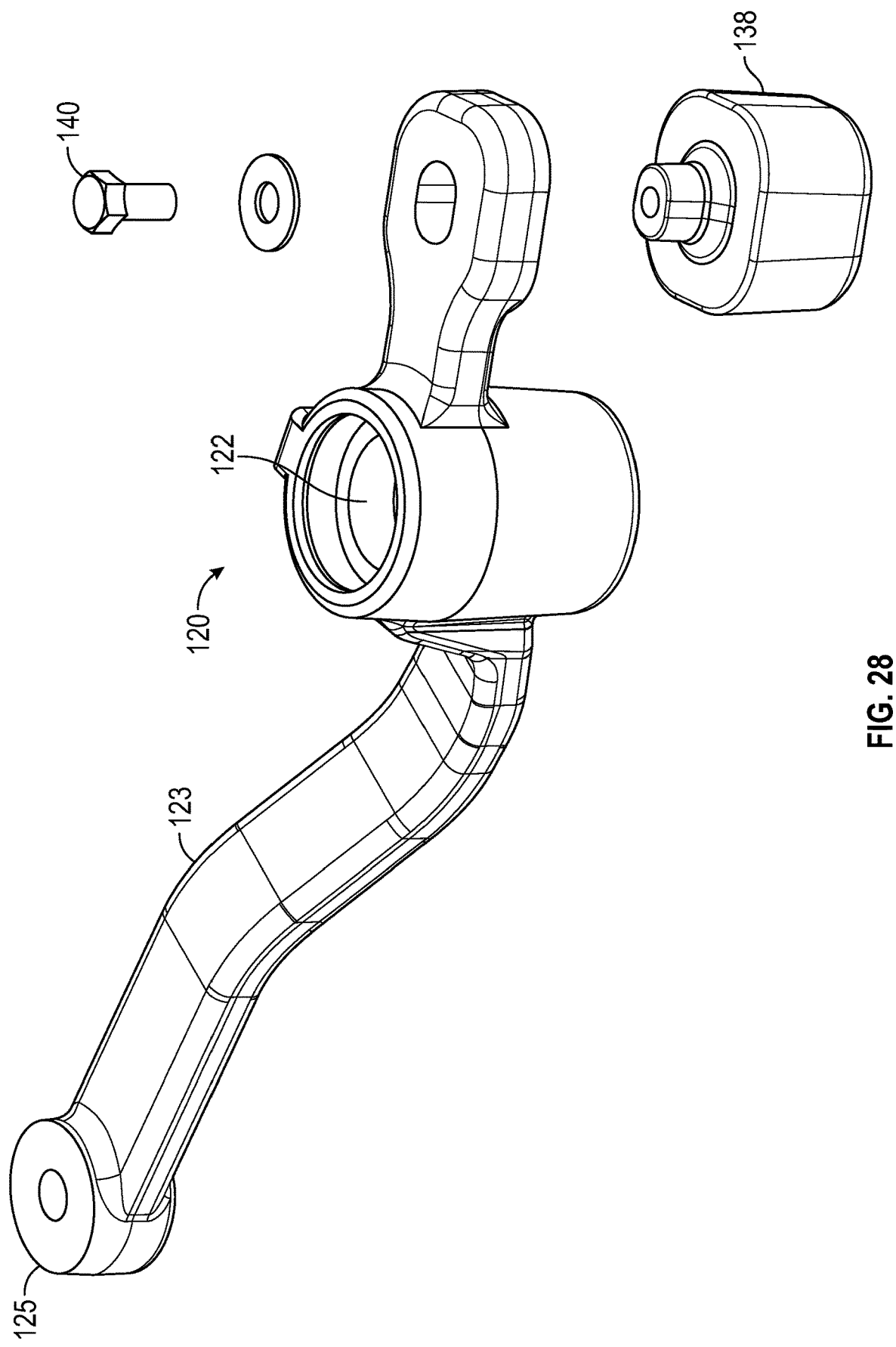
FIG. 28 is an exploded view of a gauge wheel pocket.

FIGS. 25 and 26 show additional aspects of a row unit. For example, the figures show a scraper system 110 which can be utilized with the system to aid in cleaning the opening wheels 53 thereof. The scraper system 110 includes a scraper 112 that it can be attached to the frame 38 of the row unit. As is shown, a portion of the frame 38 includes a notch 111 in which corresponds to arms of the scraper 112. Thus, the scraper can be positioned in an accurate location with a nut 116 or other mechanical connection mechanism. Furthermore, the scraper 112 includes scraper holders 114. The arms 114 can be utilized to be positioned about opposite sides of a seed to ground delivery system 52. Thus, the arms 114 can aid in holding these seed to ground delivery system 52 in a desired location and to aid in mitigating lateral movement thereof. Still further, the scraper system 110 can be utilized to aid in cleaning aspects of the seed to ground delivery system 52 to remove debris and/or otherwise provide for cleaning thereof for better accuracy planting thereby.

Paragraphs 27-32 show additional aspects of the row unit, which can be utilized with either the push or pull units described herein. The figures describe aspects of a gauge wheel system 50 which, as previously disclosed, aid in obtaining and maintaining a generally desired depth of furrow created by the opening wheels. Thus, the gauge wheel assembly 50 as shown will show numerous components that can be adjusted or otherwise allow for movement to aid in said maintaining consistent depth of the furrow. For example, gauge wheels 124 are shown which are generally used to ride upon the field. Any change in location or force applied between the field and the gauge wheels can provide feedback and/or connection to additional components to the gauge wheel system to aid in attempting to maintain said depth by the opening system. Still further, sensors can be included to provide feedback in the form of force applied via the gauge wheels such that downforce can be adjusted via the downforce actuator 36 to aid in maintaining a desired force and depth of furrow created via the row unit components.

A gauge wheel arm 120 is operatively connected to the gauge 124 and remaining components of the system. The gauge wheel arm 120 includes a pocket 122 for connecting aspects of the system. An arm 123 extends between the gauge wheel aperture 122 and a gauge wheel pivot 125. The gauge wheel 125 can be operatively connected to the gauge wheel 124 to allow for rotatable or pivotable movement between the devices and/or components. Furthermore, a pocket 138 is connected to the gauge wheel arm 120, such as a mechanical connection 140. The pocket will be disclosed in greater detail herein.

As shown in the figures, the gauge wheel arm 120 will be connected to the row unit frame via a row unit pin 128. The row unit pin 128, as is shown in the figures, extends through the frame 38 as row unit and is connectable to gauge wheel arms 120 of opposite sides thereof. Thus, it should be appreciated that the gauge wheel arms 120 are positioned on opposite sides of the row unit frame and each attached to associated gauge wheels 124. However, for exemplary purposes, only one side will be described herein. The adjustability of the gauge wheel arm via the pin 128 is desirable to allow for varying adjustments of the gauge wheels, which will associate to varying depths and/or controls for the gauge wheel 124. However, the components including the pin 128 and gauge wheel arm 120 need to be moveable with respect to one another. In order to reduce the complexity of the system and reduce the use of grease for allowing for the movement of the gauge wheel arm 120 relative to the pin 128, aspects of the present disclosure provide for a greaseless bushing to be used as part of the system. As shown in the figures, the greaseless pushing is in the form of a bearing 126. The bearing 126 may comprise a fiber bushing or other greaseless bushing which can allow for movement of the materials, such as the gauge wheel arm 120 and the pin 128 without the requirement of continued application of grease or other lubricating liquids. As shown best in FIGS. 30-32, the gauge wheel arm 120 includes an aperture 122. Within the aperture extends a portion of the row unit pin 128. To allow movement between the pin 120 and the gauge wheel arm 122, the bearing 126 is positioned within a portion of the aperture 122. The bearing 126, such as in the form of the fiber bushing, can be held in place via snap rings 122 on opposite sides thereof. Such snap rings will aid in maintaining lateral movement or otherwise mitigating lateral movement of the lateral bearing 126. A depth adjustment member 130 is positioned at least partially in the gauge wheel arm 120 and connected to the pin 128 via threading. The pin 128 and depth adjustment member 130 can further be held in place via snap rings, retaining washers 134, and/or bolts or other pins 136.

Figure 30:
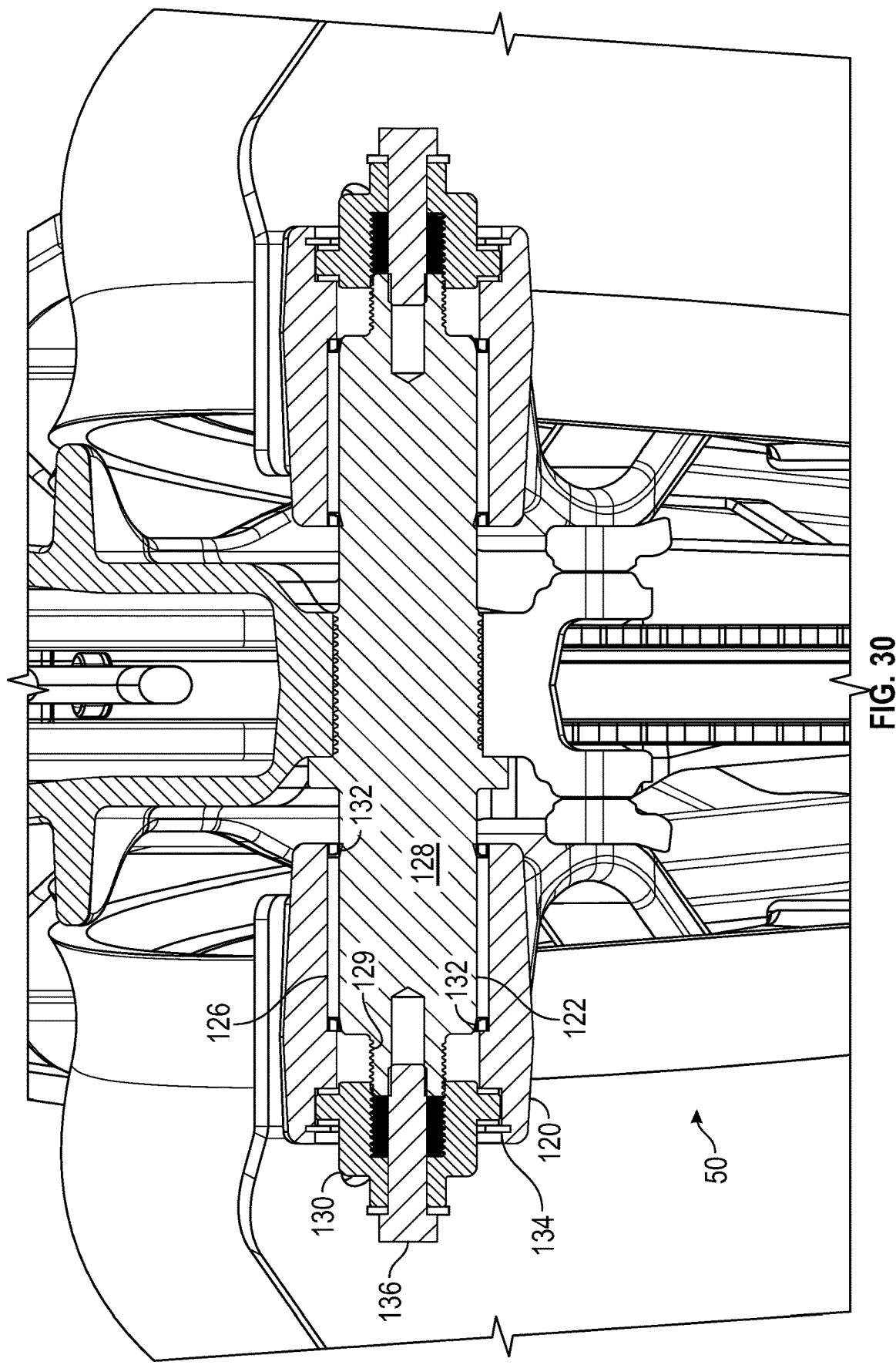
FIG. 30 is a sectional view of the gauge wheel pocket in an extended configuration.
Figure 31:
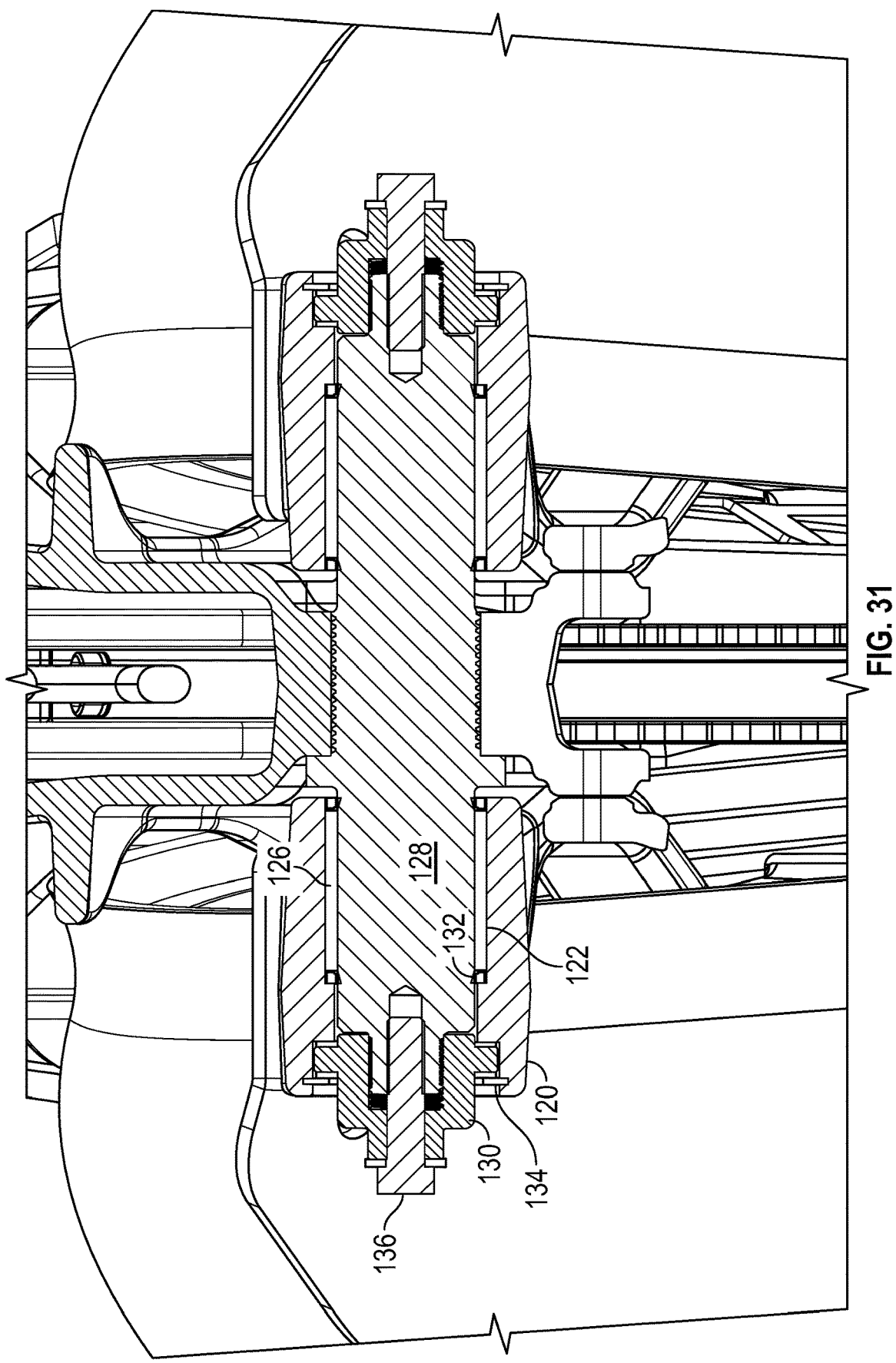
FIG. 31 is a sectional view of the gauge wheel pocket in a retracted configuration.
Figure 32:
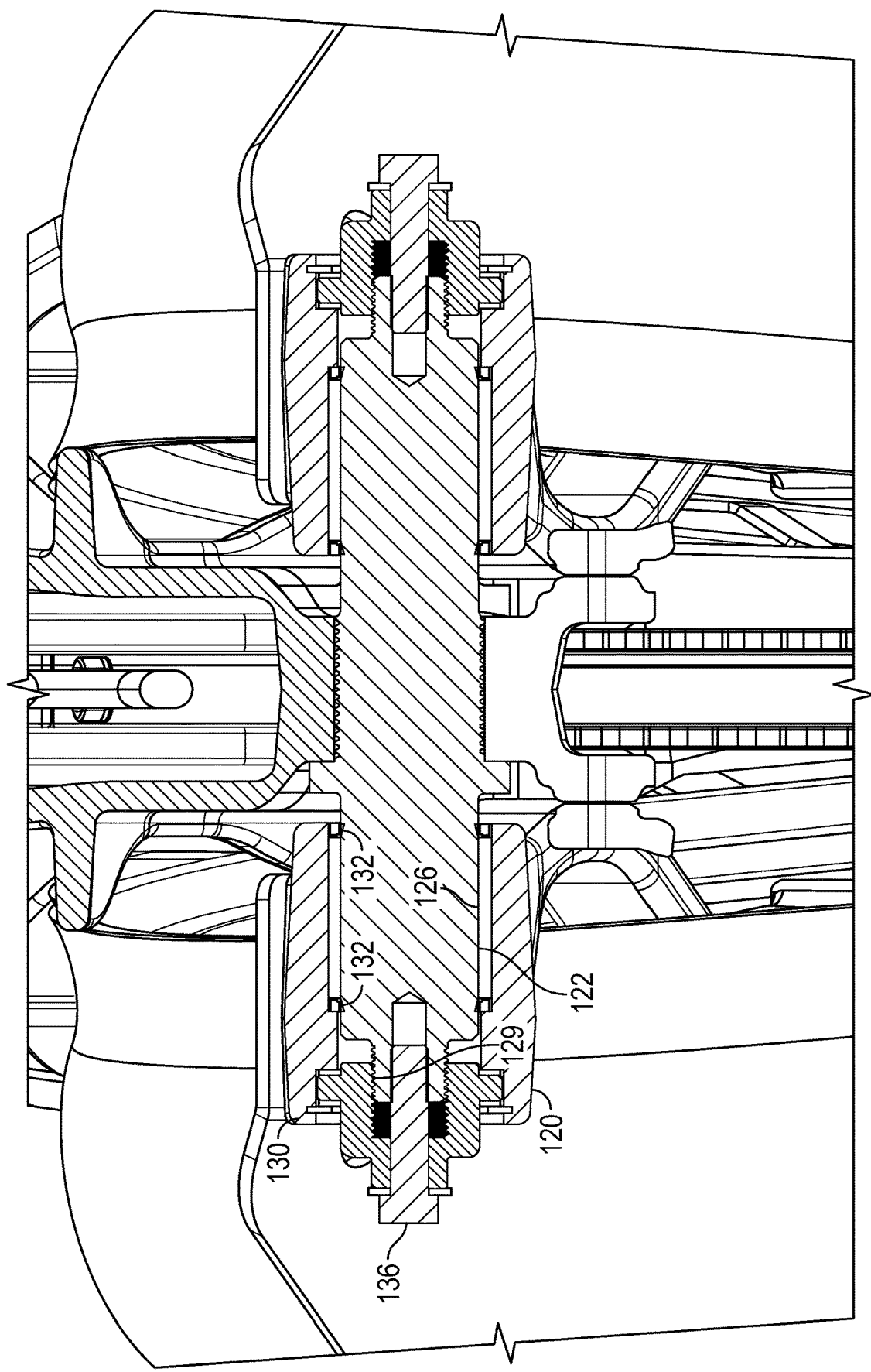
FIG. 32 is a sectional view showing another view of the gauge wheel assembly.

As shown in FIGS. 30-32, the depth of the opening furrow, such as controlled via the gauge wheels can be achieved via the depth adjustment members 130 and there corresponding location with respect to the row unit pin 128. For example, FIG. 30 shows the gauge wheel and extracted configuration wherein the depth adjustment members are moved generally distally from the row unit pin 128, which widens the space between corresponding gauge wheels on opposite sides of the row unit frame 38. Likewise, FIG. 31 shows the pin in a retracted position, wherein the gauge wheels are closer to one another. Such adjustment of the positions between the gauge wheels and the overall shape and configuration of the gauge wheels themselves will control the depth and maintaining thereof of the created furrow of the gauge wheel system. Thus, the depth and control of the gauge wheels can be set and maintained in a much easier configuration, and which also does not require additional usage of grease or other lubricating elements in order to maintain the movement of the row unit pin relative to the gauge wheel arm 120.

Figure 29:
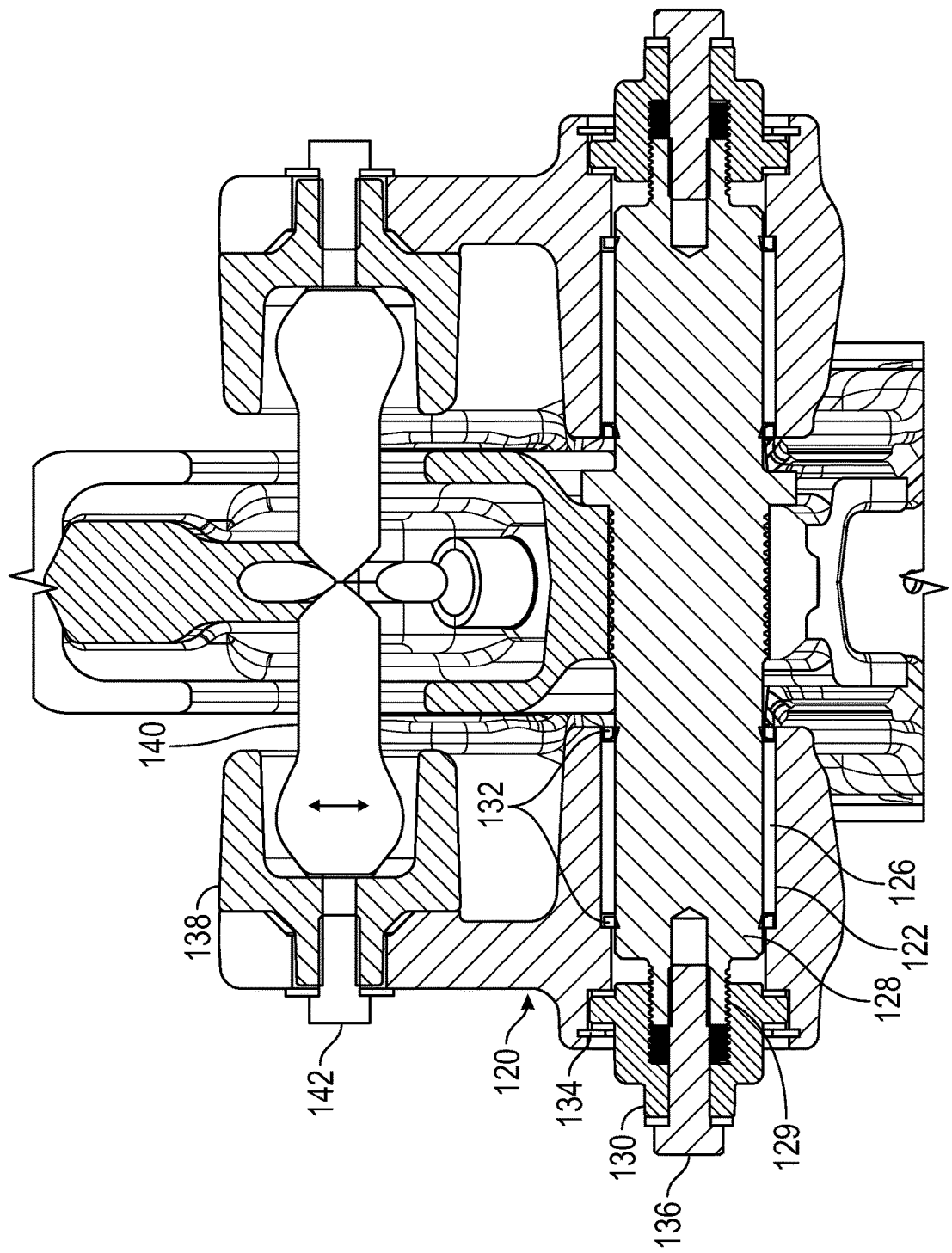
FIG. 29 is a sectional view of the gauge wheel pocket.

In addition, as noted, the gauge wheel arm includes a pocket 38 operatively connected to a portion thereof. The pocket 138 is utilized to house a portion of a sensor in the form of a dog bone 140. As the gauge wheels move throughout the field with varying elevation and/or other obstruction therein, the gauge wheels will generally move in vertical directions. Such vertical movement of the gauge wheels 124 will cause likewise movement of the gauge wheel arms 120. This includes a portion of the pocket 138 that is connected to the gauge wheel arms 120. The pocket includes an aperture or cavity in which a portion of the dog bone 140 is also received. Therefore, movement of the gauge wheel arm in the direction as shown in the arrow in FIG. 29 will interact with the dog bone on either side of the row unit frame. The dog bone is a sensor which is utilized to provide feedback upon said contact of the gauge wheel arm relative to the dog bone and can provide feedback to the downforce sensor to provide adjustments as needed to the downforce in order to maintain a desired depth in the field via the gauge wheel system.

As shown, the pocket in which the dog bone resides includes a generally C-shape with a cavity therein. A retaining bolt is utilized to connect the pocket 138 to the gauge wheel arm 120. However, as the gauge wheel pocket is in contact with the dog bone and may be a wear part, the easy access and removal of the pocket 138 without needing to replace the remaining portions of the gauge wheel arm 120 is advantageous and an improvement over prior art. For example, if the pocket becomes worn or otherwise needs replaced, the retaining bold 142 can simply be removed and the pocket replaced without having to replace the entire gauge wheel arm or other components of the gauge wheel system 50. Therefore, this provides another advantage and improvement of the components as shown and described.

Figure 33:
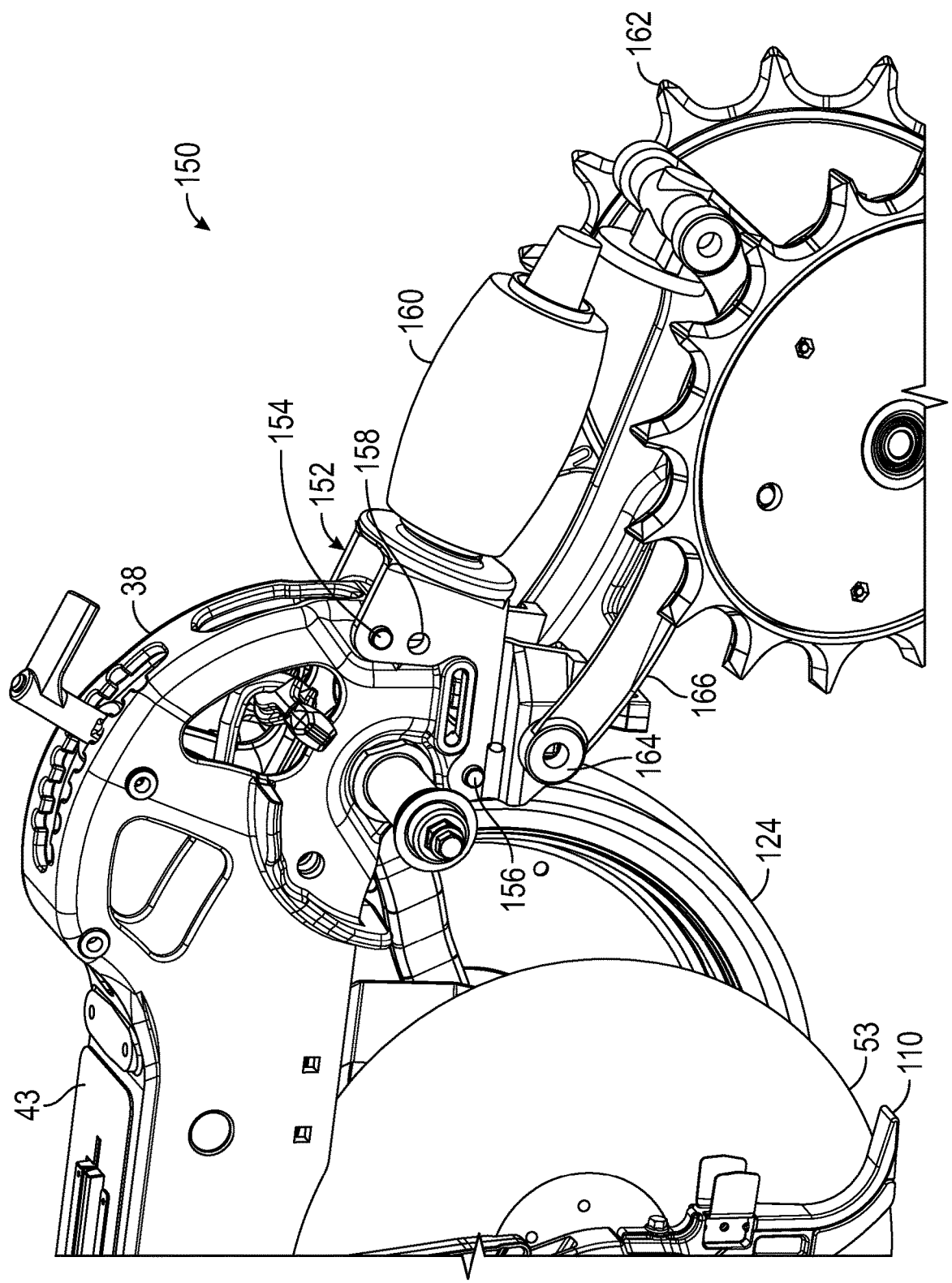
FIG. 33 is a perspective view of a closing assembly for use with a row unit showing the air side of the closing assembly.
Figure 34:
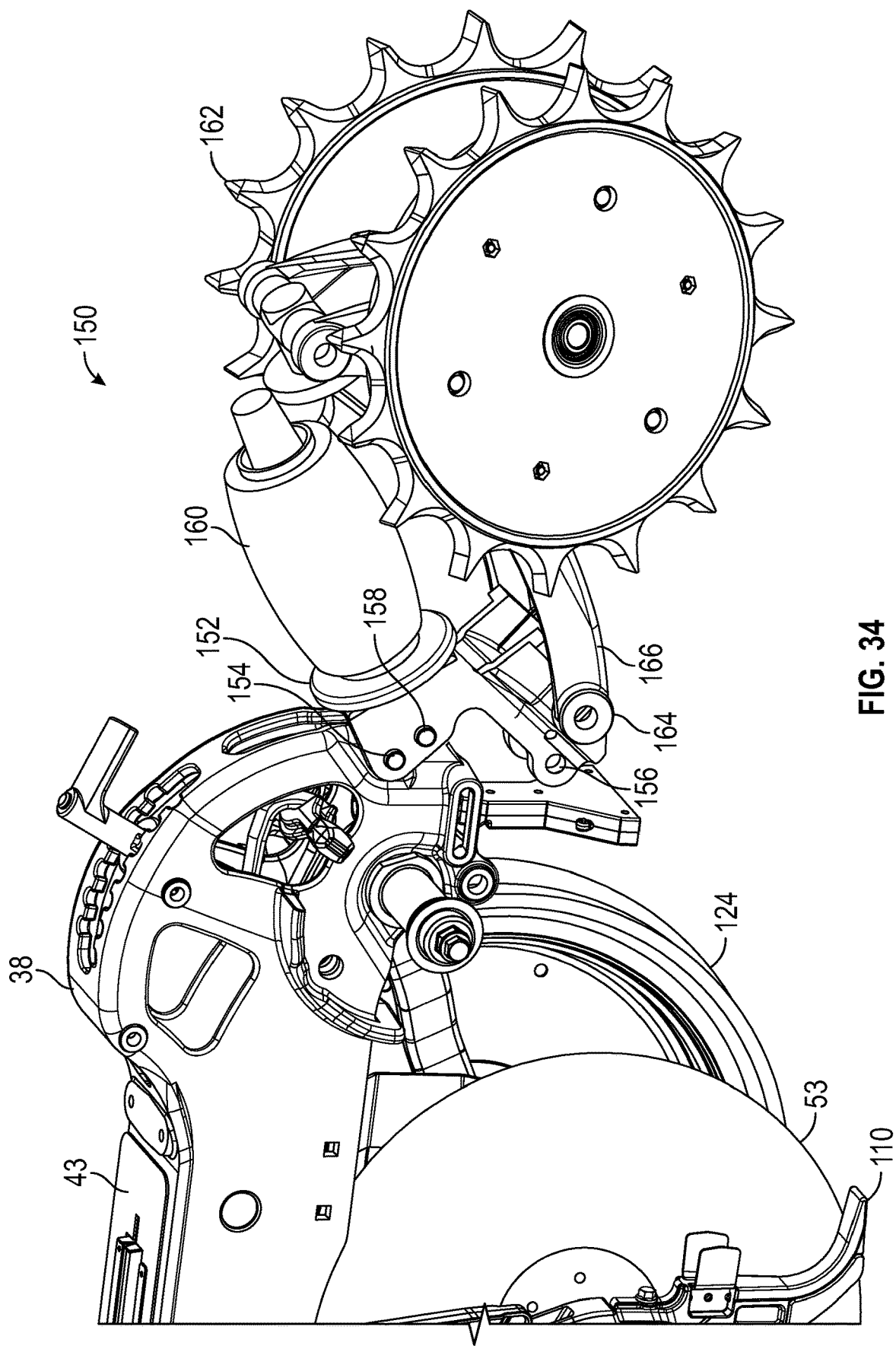
FIG. 34 is a perspective view of FIG. 33 in a raised configuration.

Still further components of the system include a closing system 150 and closing system 170 as shown in FIGS. 33-36. As will be understood, the closing system 150 includes a biasing member 160 in the form of an air bag or other pneumatic device. The closing system is utilized to close the furrow created by the opening wheels about the particulate material that has been disposed therein said furrow. Therefore, it is advantageous for the closing system to close said furrow accurately and fully in order to provide the seed or other particulate material placed therein to have the best opportunity for growth. The closing system 150 as shown in FIGS. 33 and 34 include a closing system frame 152. The frame 152 includes a number of connection points in the form of apertures. For example, the frame includes a first connection point 154, second connection point 156, and third connection point 158. The first and third connection points are generally adjacent one another with the frame being generally L shaped and the second point 156 at an opposite arm of the L shaped frame 152. As noted, in the connection points of the frame 152 may correspond or otherwise engage a portion of the row unit frame 38. Such engagement may provide for advantages, such as movement of the closing system between raised and lowered configurations in an easy manner. For example, while the closing system is to be in a lower position during field use, during transport or other configurations, it may be desirable to raise portions of the closing system including the closing wheels 162 as to non-engage a portion of the ground. Therefore, as will be understood, aspects and advantages of the closing system 150 as herein shown or described will make it easier and provide confidence in moving the closing system between raised and lower configurations.

FIG. 33 shows the closing system in a lower configuration. In such configuration, the first connection point 54 is connected to the frame 38 via a pin or other mechanical linkage device. Likewise, the second connection point 156 is also in engagement with an aperture or portion of the frame 38. Having the connections 154 and 156 on opposite ends of the L shape frame 152 ensure that the position of the frame in corresponding closing system will be maintained relative to said frame of the row unit 38. Note however, that the third connection point 158 is unused in said lower configuration. While it is unused in said configuration, it should be appreciated that in corresponding aperture of the frame 38 may be included so as to provide a third point of connection between the closing frame 152 and the row unit frame 38. However, it need not be required in all configurations.

In such lowered position, the closing system 150 further includes closing wheels connected to the frame 150 to via linkage arms 166. These include connection to a mounting member 164 of the closing system, which is connected to the frame 152. The biasing member 160 is connected between the frame 152 and the closing wheels 162 and also to the linkage arms 166. The biasing member, as indicated, is in the form of an airbag 160 or other pneumatic device. However, it should be appreciated that this not need be limiting on the invention, and the biasing member 160 can be other types of actuators including but not limited to hydraulic actuators, pneumatic actuators, linear actuators, springs, or the like. The biasing member 160 is provided to maintain a downward force of the closing wheels 162 relative to the ground, while still allowing some upward vertical movement thereof, such as when in contact with an obstruction or other component in the field.

FIG. 34, as indicated, shows the closing system 150 in a raised configuration which may be desired for transporting a row unit or otherwise in a non-use configuration. As shown in the figure, the closing system 150 has been rotated, such as in the counterclockwise direction as shown in the figures. Such counterclockwise movement is allowed by removing a pin from the second connection point 156 to remove engagement of said connection point of with the row unit frame 38. The closing stem 150 can be rotated via the first connection point 154 to a position wherein the third connection point 158 is outside or otherwise not obstructed by any portion of the frame 38. At such location, a pin or other mechanical linkage can be positioned in the third connection point 158 wherein the mechanical portion can engage or otherwise contact an outer portion of the frame 38. This will hold the closing system 150 in said raised configuration as shown in FIG. 34.

Therefore, the two pin system as shown in the figures allows for the rotation of the closing system to essentially lift and lock the closing configuration in an up configuration, such as that shown in FIG. 34. Only one pin is required to be removed and be replaced to move the closing system 150 between the up and lower positions. Furthermore, a notch can be positioned in the row unit 38 to hold the third connection point 158 and pin associated with said location while allowing for some upward flow thereof. To move the configuration to the lowered configuration of FIG. 33, the pin is removed from connection point 158 the system lowered to align the second connection point 156 with a corresponding aperture of the frame 38 and inserted through the connection point 156 and the frame 38 to hold the closing system in said lowered configuration as well.

Figure 35:
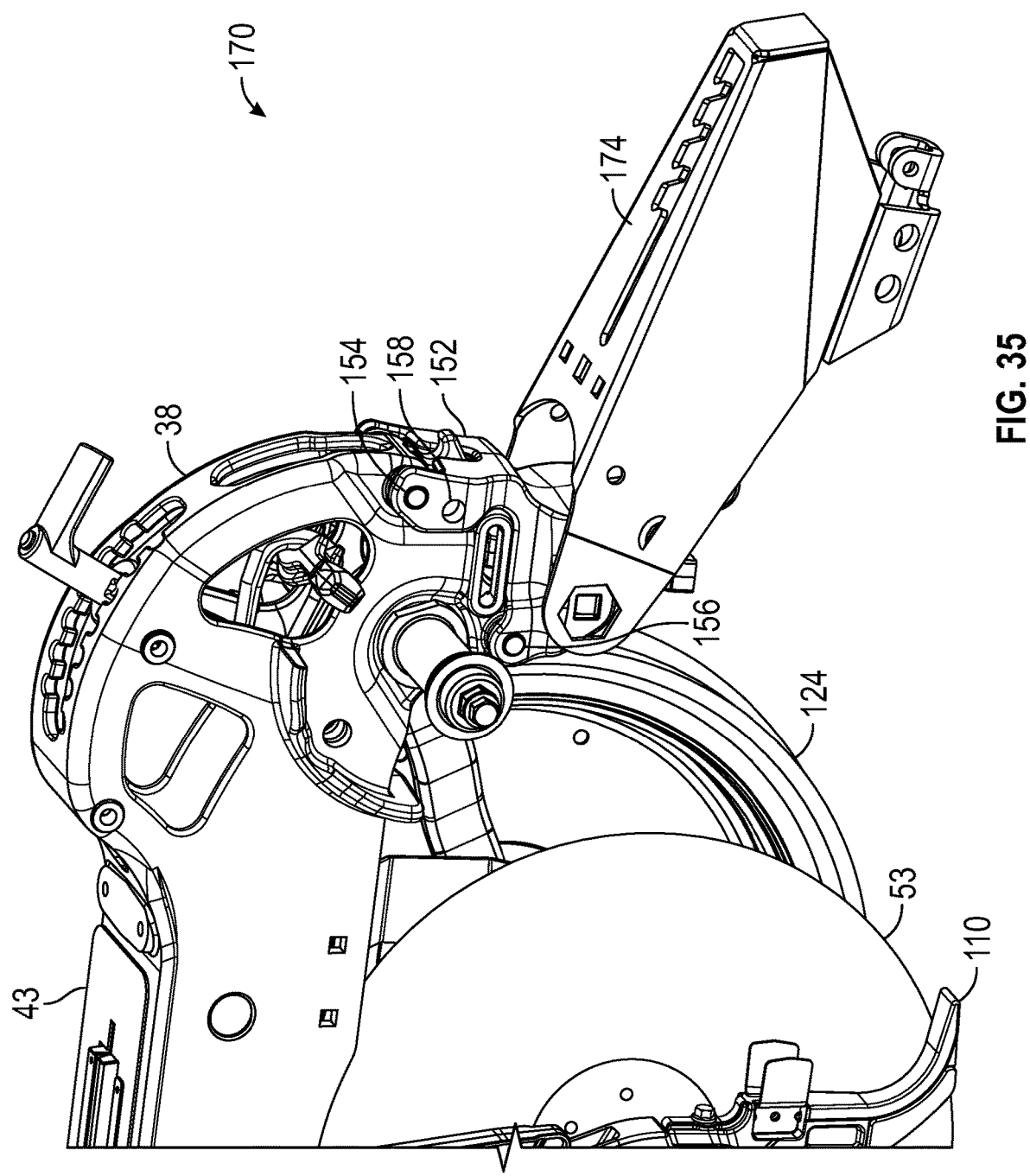
FIG. 35 is a perspective view of a closing assembly for use with a row unit showing the spring side of the closing assembly.
Figure 36:
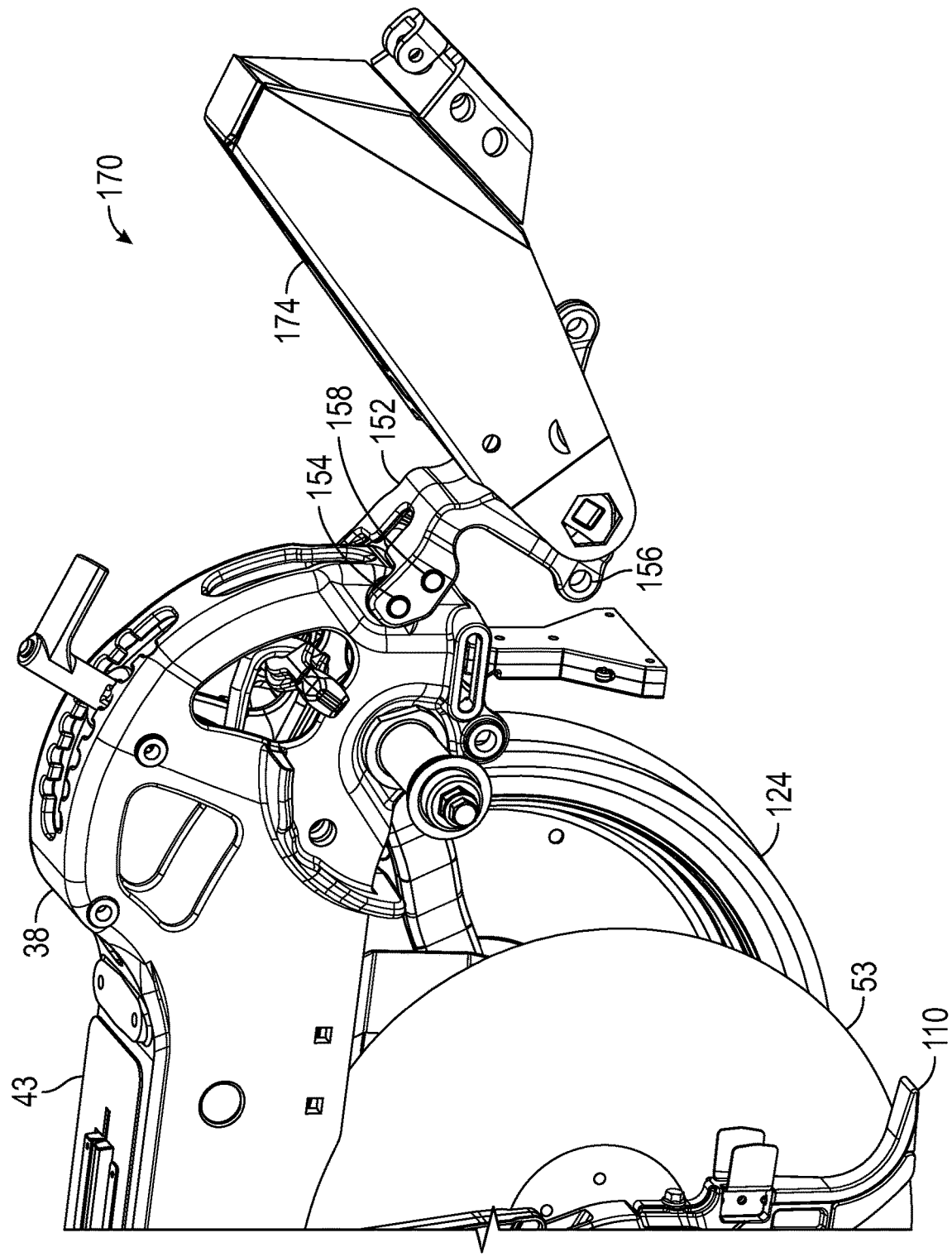
FIG. 36 is a perspective view of FIG. 35 in a raised configuration.

FIGS. 35 and 36 show yet additional embodiment of a closing system 170. The closing system 170 includes the same frame 152 in connection points as shown and described herein. However, the closing system 170 includes a spring system for a biasing member instead of an airbag. The spring system 174 provides an additional way for providing biasing forces towards the ground for a closing system. However, the spring housing 174 can be raised and lowered via the frame 154 of the closing system 170 via the two pin system as previously disclosed herein. Therefore, the two pin system can be utilized with generally with any biasing member and/or closing system, and is not to be limited to airbags or any specifically type of biasing member.

Therefore, aspects, advantages, improvements, and other novel components of a row unit have been shown and/or described herein. As should be appreciated, not all aspects and/or embodiments as shown and described need be required in all embodiments for the improvements to be achieved. For example, one or more of the components may be utilized with a row unit while still achieving improvements and/or advantages over the prior art. Still further, it should be appreciated that any aspect or component of any of the embodiments or individual features shown or described herein could be combined with other individual components or other aspects described herein in any manner which may not be explicit as shown and/or described herein. Thus, the particular number and/or number of configurations and/or specific configurations of the row units is not to be limiting to that shown and described, and one skilled in the art will appreciate that numerous combinations could be achieved via the disclosure herein. From the foregoing, it can be foreseen and understood that the disclosed invention accomplishes at least all of the stated objectives.

From the foregoing, it can be seen that the disclosed invention accomplishes at least all of the stated objectives.

The invention claimed is:

1. A row unit for an agricultural implement, comprising:
a row unit frame;
a closing assembly operatively connected to the row unit frame, said closing assembly comprising:
  a closing assembly frame including:
    a first position wherein a first connection point and a second connection point connect the closing assembly to the row unit frame to position the closing assembly in a lowered position; and
    a second position wherein a first connection point connects the closing assembly to the row unit frame and a third connection point is positioned external of the row unit frame to position the closing assembly in a raised position.

2. The row unit of claim 1, wherein the closing assembly further comprises one or more closing wheels connected to the closing assembly frame.

3. The row unit of claim 2, wherein the closing assembly further comprises a biasing member to bias the one or more closing wheels towards the ground when the closing wheel assembly is in the lowered position.

4. The row unit of claim 3, wherein the biasing member comprises:
a pneumatic device;
a spring;
a hydraulic actuator; or
an electric, linear actuator.

5. The row unit of claim 4, wherein the biasing member comprises an air bag.

6. The row unit of claim 3, wherein the closing assembly frame comprises a mounting member and a linkage connected to the mounting member.

7. The row unit of claim 6, wherein the one or more closing wheels and the biasing member are positioned at the linkage.

8. The row unit of claim 6, wherein the mounting member comprises an L-shaped member.

9. The row unit of claim 8, wherein the first and third connection points positioned on the mounting member generally adjacent one another, and wherein the second connection point positioned opposite the first and third connection points.

10. The row unit of claim 1, wherein the first, second, and third connection points comprise apertures with pins positioned therethrough when the connection points are connected.

11. The row unit of claim 10, wherein only two of the three connection points include pins in either the raised or lowered positions.

12. The row unit of claim 11, wherein the first and second connection points correspond to apertures in the row unit frame, and wherein the third connection point does not correspond to an aperture in the row unit frame.

* * * * *